US009071700B2

(12) United States Patent
Toyoda et al.

(10) Patent No.: US 9,071,700 B2
(45) Date of Patent: Jun. 30, 2015

(54) COMMUNICATION SYSTEM, COMMUNICATION TERMINAL, SERVER, COMMUNICATION METHOD AND PROGRAM

(75) Inventors: Yuki Toyoda, Tokyo (JP); Takeaki Minamizawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 223 days.

(21) Appl. No.: 13/581,235

(22) PCT Filed: Feb. 21, 2011

(86) PCT No.: PCT/JP2011/053661
§ 371 (c)(1),
(2), (4) Date: Aug. 24, 2012

(87) PCT Pub. No.: WO2011/105322
PCT Pub. Date: Sep. 1, 2011

(65) Prior Publication Data
US 2012/0322425 A1 Dec. 20, 2012

(30) Foreign Application Priority Data

Feb. 26, 2010 (JP) ................................. 2010-041990

(51) Int. Cl.
*H04M 3/42* (2006.01)
*H04M 1/725* (2006.01)
*H04M 1/2745* (2006.01)

(52) U.S. Cl.
CPC ........ *H04M 1/72569* (2013.01); *H04M 1/2745* (2013.01); *H04M 3/42008* (2013.01); *H04M 2250/12* (2013.01)

(58) Field of Classification Search
CPC ...................................................... H04W 4/00
USPC .................. 455/414.1, 569.1, 550.1; 340/8.1, 340/539.1, 539.11, 539.13, 539.19, 539.22, 340/573.1, 573.4, 669; 702/141, 150
See application file for complete search history.

(56) References Cited

U.S. PATENT DOCUMENTS 7,626,499 B2 * 12/2009 Burneske et al. ........ 340/539.13
8,150,377 B2 * 4/2012 Patterson et al. .......... 455/414.1
(Continued)

FOREIGN PATENT DOCUMENTS

CN 101383870 A 3/2009
JP 2006-236264 A 9/2006
(Continued)

OTHER PUBLICATIONS

Search Report dated Jan. 17, 2014, issued by the State Intellectual Property Office of the People's Republic of China in corresponding Application No. 201180007884.8.
(Continued)

*Primary Examiner* — Amancio Gonzalez
(74) *Attorney, Agent, or Firm* — Sughrue Mion, PLLC

(57) ABSTRACT

Disclosed is a communication system having two or more communication terminals. The communication system has: an attitude state detecting means which detects the attitude state of each of the communication terminals; a relationship calculating means which calculates the attitude state relationship between the communication terminals, on the basis of the communication terminal attitude states detected by the attitude state detecting means; and a communication policy determining means which determines, on the basis of the attitude state relationship between the communication terminals, a communication policy to be applied to between the communication terminals.

17 Claims, 26 Drawing Sheets

(56) References Cited

U.S. PATENT DOCUMENTS

| | | | |
|---|---|---|---|
| 2004/0102211 A1* | 5/2004 | Ishida | 455/550.1 |
| 2005/0234676 A1* | 10/2005 | Shibayama | 702/141 |
| 2010/0223096 A1* | 9/2010 | Bosan et al. | 705/10 |
| 2012/0064951 A1* | 3/2012 | Agevik et al. | 455/569.1 |

FOREIGN PATENT DOCUMENTS

| | | |
|---|---|---|
| JP | 2008-72269 A | 3/2008 |
| JP | 2008-92304 A | 4/2008 |
| JP | 2008-154004 A | 7/2008 |
| JP | 2009-86916 A | 4/2009 |
| JP | 2009-188764 A | 8/2009 |
| JP | 2009-253393 A | 10/2009 |
| JP | 2010-21810 A | 1/2010 |

OTHER PUBLICATIONS

Communication dated Oct. 29, 2014, issued by the Japanese Patent Office in counterpart Japanese application No. 2012-501765.

* cited by examiner

| POSTURE STATUS RELATIONSHIP (ANGLE) | COMMUNICATION POLICY (DISCLOSURE LEVEL) |
|---|---|
| 0 DEGREE | NAME |
| 90 DEGREE | NAME, MAIL ADDRESS |
| 180 DEGREE | NAME, MAIL ADDRESS, TELEPHONE NUMBER |

[TRANSMISSION DATA DETERMINER WITHIN MOBILE TELEPHONE A]
TRANSMISSION DATA CORRESPONDING TO NUMBER OF TIMES OF OSCILLATIONS (a)

| NUMBER OF TIMES OF OSCILLATIONS | TRANSMISSION DATA |
|---|---|
| 1-5 | Alice |
| 6-10 | Alice, 090-3333-4444 |
| 11- | Alice, 090-3333-4444, alice@carrier.com |

[TRANSMISSION DATA DETERMINER WITHIN MOBILE TELEPHONE B]
TRANSMISSION DATA CORRESPONDING TO NUMBER OF TIMES OF OSCILLATIONS (b)

| NUMBER OF TIMES OF OSCILLATIONS | TRANSMISSION DATA |
|---|---|
| 1-5 | Bob |
| 6-10 | Bob, 090-1111-2222 |
| 11- | Bob, 090-1111-2222, bob@carrier.com |

FIG. 9

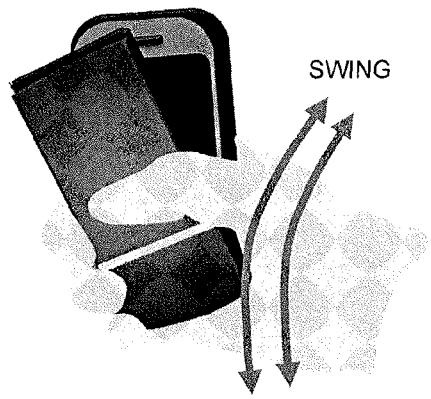

[TRANSMISSION DATA DETERMINER WITHIN MOBILE TELEPHONE A]
TRANSMISSION DATA CORRESPONDING TO ANGLE (a)

| ANGLE | TRANSMISSION DATA |
|---|---|
| 0 | 090 - 8765 - 4321 |
| 90 | 090 - 9876 - 5432 |

[TRANSMISSION DATA DETERMINER OF NON-CONTACT TYPE CARD READER]
TRANSMISSION DATA CORRESPONDING TO ANGLE (b)

| ANGLE | TRANSMISSION DATA |
|---|---|
| 0 | 03 - 1234 - 5678 |
| 90 | 03 - 2468 - 1357 |

TRANSMISSION DATA CORRESPONDING TO ANGLE

| ANGLE | POLICY |
|---|---|
| 0 | BEING VALID FOR ONE HOUR |
| 90 | BEING VALID FOR THREE DAYS |
| 180 | BEING VALID FOR ONE WEEK |

FIG. 20

ANONYMITY LEVEL CORRESPONDING TO
NUMBER OF TIMES OF OSCILLATIONS

| NUMBER OF TIMES OF OSCILLATIONS | ANONYMITY LEVEL |
|---|---|
| 1-5 | ANONYMITY COMMUNICATION |
| 6-10 | PSEUDONYM COMMUNICATION |
| 11- | REAL-NAME COMMUNICATION |

FIG. 23

POLICY CORRESPONDING TO ANGLE

| DETECTION ANGLE | COMMUNICATION POLICY |
|---|---|
| 0 | ANONYMITY COMMUNICATION |
| 90 | PSEUDONYM COMMUNICATION |
| 180 | REAL-NAME COMMUNICATION |

POLICY CORRESPONDING TO ANGLE

| DETECTION ANGLE | COMMUNICATION POLICY | NUMBER OF TIMES USER IDENTIFIER "user001" IS REACHABLE | NUMBER OF TIMES USER IDENTIFIER "user002" IS REACHABLE |
|---|---|---|---|
| 0 | ANONYMITY COMMUNICATION | 1 | 5 |
| 90 | PSEUDONYM COMMUNICATION | 5 | 10 |
| 180 | REAL-NAME COMMUNICATION | UNLIMITED | UNLIMITED |

GROUP INFORMATION OF USER 002

| GROUP NUMBER | GROUP NAME | USER IDENTIFIER |
|---|---|---|
| 1 | RESTAURANT EMPLOYEE | User002, user004, user006 |
| 2 | LABORATORY | user002, user008, user016 |

SCHEDULE NOTE OF user002

| 10-16 APRIL, 2009 5110 | | | | | | |
|---|---|---|---|---|---|---|
| 10(MON.) | 11(TUE.) | 12(WED.) | 13(THU.) | 14(FRI.) | 15(SAT.) | 16(SUN.) |
| | | 13-15 [CIRCLE] RECRUITING ACTIVITY | | | | |

FIG. 32

GROUP INFORMATION OF user002

| GROUP NUMBER | GROUP NAME | USER IDENTIFIER | 5220 |
|---|---|---|---|
| 1 | CIRCLE | user002, user004, user006 | |
| 2 | LABORATORY | user002, user008, user0016 | |

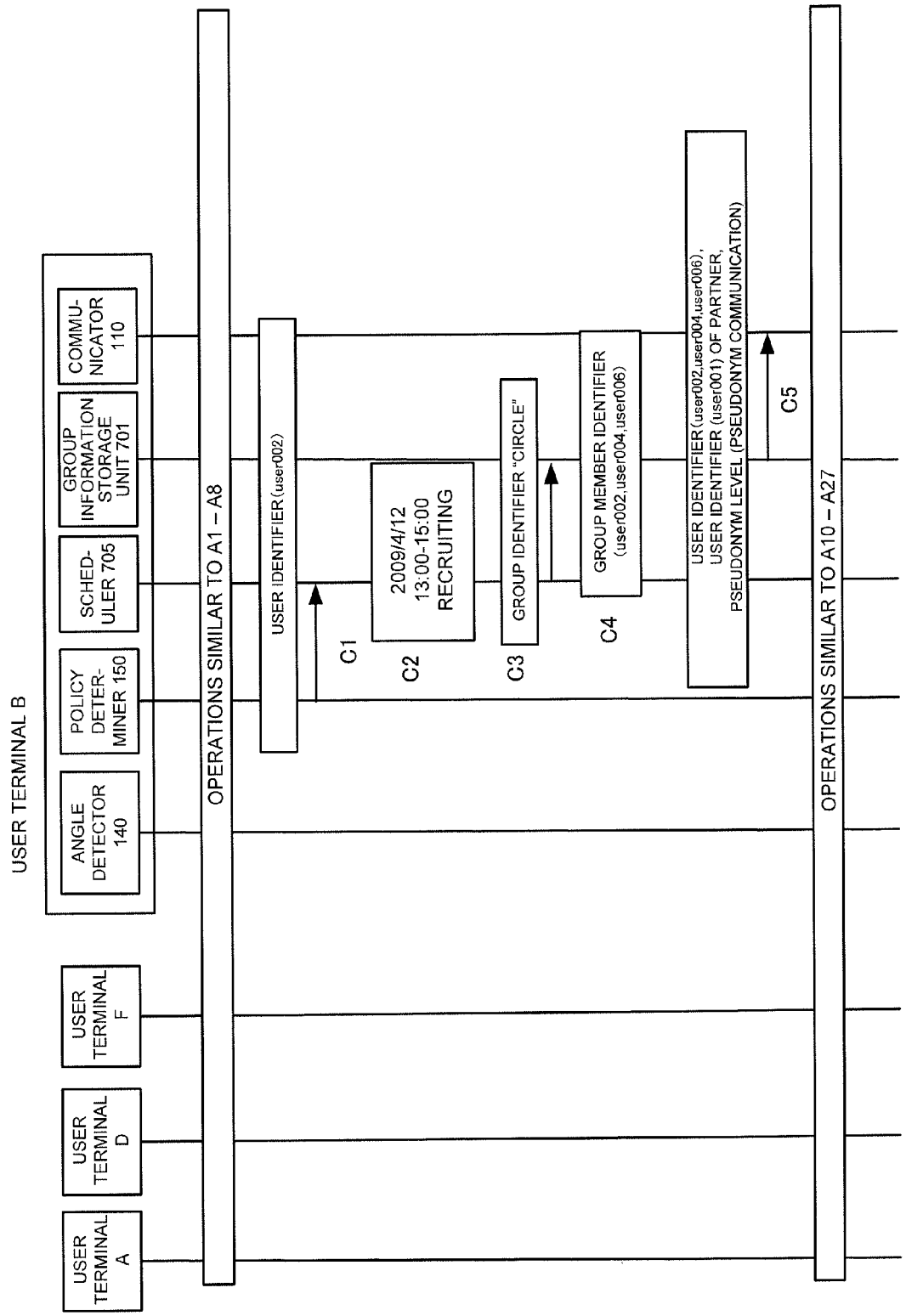

COMMUNICATION SYSTEM, COMMUNICATION TERMINAL, SERVER, COMMUNICATION METHOD AND PROGRAM

CROSS REFERENCE TO RELATED APPLICATIONS

This application is a National Stage of International Application No. PCT/JP2011/053661, filed on Feb. 21, 2011, which claims priority from Japanese Patent Application No. 2010-041990, filed on Feb. 26, 2010, the contents of all of which are incorporated herein by reference in their entirety.

TECHNICAL FIELD

The present invention relates to a communication system, a communication terminal, a server, a communication method, and a program therefor.

BACKGROUND ART

Its own name and contact address (mail address and telephone number) need to be conveyed at the time of auction for carrying out transactions of goods via Internet and reserving restaurants, and the like in many opportunities.

However, the mail address, the telephone number and the like are private information, and flow of its own information should be avoided. Further, an action to inquire the mail address of another person is an action to inquire the private information, so the situation is that not only a partner of whom the private information is inquired, but also an inquirer itself cannot easily cope therewith.

Thereupon, services capable of anonymously making a contact with other persons and studies/developments for it have been actively performed. For example, in Patent literature 1, a user lists a mail address of a partner that should be kept anonymous in a main text of a mail when posting the mail to a mailing list, thereby enabling the user to anonymously transmit the mail.

Further, in Patent literature 2, a user A can acquire the anonymous mail address by only transmitting the mail to an anonymous mail address issuing server when acquiring the anonymous mail address. Utilizing this anonymous mail address enables the user A to anonymously make a contact with a user B with which the user A desires to anonymously make a contact.

CITATION LIST

Patent Literature

PTL 1: JP-2006-236264A
PTL 2: JP-2009-86916A

SUMMARY OF INVENTION

Technical Problem

However, the technologies of the literatures mentioned in the back ground art have points at issue described below.

In the Patent literature 1, the mail address of the partner with which communication is performed anonymously needs to be listed in the main text of the mail. In this case, there exists a problem that the communication cannot be anonymously performed when the mail address of the partner is unknown The Patent literature 2 has a problem that when the user A and the user B desire to perform anonymity communication with each other, the anonymous mail address acquired by the user A needs to be printed and delivered with an QR code in some cases, or to be written in paper in some case so as to inform the user B of it, and labor and time are required.

Thereupon, the present invention has been accomplished in consideration of the above-mentioned problems, and an object thereof is to provide a communication system, a communication terminal, a server, a communication method, and a program therefor capable of deciding a policy in a simplified manner and performing communication when performing the communication having the policy reflected therein.

Solution to Problem

The present invention is a communication system comprising at least two communication terminals or more, comprising: attitude status detecting means that detects an attitude status of the communication terminal; relationship calculating means that calculates a relationship of the attitude status between said communication terminals based on the attitude status of each communication terminal detected by said attitude status detecting means; and communication policy determining means that determines a communication policy to be applied between said communication terminals based on the relationship of the attitude status between said communication terminals.

The present invention is a communication system comprising at least one first communication terminal or more, at least one second communication terminal or more, and a server: wherein said first communication terminal comprises: attitude status detecting means that detects an attitude status of its own first communication terminal; and transmitting means that transmits said detected attitude status and an identifier of its own first communication terminal to said second communication terminal; wherein said second communication terminal comprises: attitude status detecting means that detects the attitude status of its own second communication terminal; relationship calculating means that calculates a relationship of the attitude status between said first communication terminal and said second communication terminal based on the attitude status of said first communication terminal and the attitude status of said second communication terminal; communication policy determining means that determines a communication policy to be applied between said first communication terminal and said second communication terminal based on said relationship of the attitude status; and transmitting means that transmits said communication policy, and identifiers of said first communication terminal and said second communication terminal to said server; and wherein said server comprises communicating means that, based on the identifiers of said first communication terminal and said second communication terminal, and said communication policy, configures communication based on said communication policy for the communication between said first communication terminal and said second communication terminal.

The present invention is a communication terminal in a communication system comprising communication policy determining means that determines, based on a relationship of an attitude status between the communication terminals, a communication policy to be applied between said communication terminals, comprising: attitude status detecting means that detects the attitude status of its own communication terminal; receiving means that receives the attitude status of a communication destination communication terminal, being a communication destination, and an identifier of said communication destination communication terminal; relationship calculating means that calculates a relationship of the attitude status between said its own communication terminal and said communication destination communication terminal based on the attitude status of said its own communication terminal and the attitude status of said communication destination communication terminal; and transmitting means that transmits said relationship of the attitude status, and the identifiers of said its own communication terminal and said communication destination communication terminal to said communication policy determining means.

The present invention is a communication terminal in a communication system comprising communicating means that configures communication based on a predetermined policy between the communication terminals, comprising: attitude status detecting means that detects an attitude status of its own communication terminal; receiving means that receives the attitude status of a communication destination communication terminal, being a communication destination, and an identifier of said communication destination communication terminal; relationship calculating means that calculates a relationship of the attitude status between said its own communication terminal and said communication destination communication terminal based on the attitude status of said its own communication terminal and the attitude status of said communication destination communication terminal; communication policy determining means that determines a communication policy to be applied between said its own communication terminal and said communication destination communication terminal based on said relationship of the attitude status; and transmitting means that transmits said communication policy, and the identifiers of said its own communication terminal and said communication destination communication terminal to said communicating means.

The present invention is a communication terminal, comprising: attitude status detecting means that detects an attitude status of its own communication terminal; receiving means that receives the attitude status of a communication destination communication terminal, being a communication destination, and an identifier of said communication destination communication terminal; relationship calculating means that calculates a relationship of the attitude status between said its own communication terminal and said communication destination communication terminal based on the attitude status of said its own communication terminal and the attitude status of said communication destination communication terminal; communication policy determining means that determines a communication policy to be applied between said its own communication terminal and said communication destination communication terminal based on said relationship of the attitude status; and communicating means that performs communication based on said communication policy between said its own communication terminal and said communication destination communication terminal.

The present invention is a communication method in a communication system comprising at least two communication terminals or more, comprising: detecting an attitude status of each communication terminal; calculating a relationship of the attitude status between said communication terminals based on the attitude status of said each communication terminal; and determining information to be transmitted to at least one communication terminal or more, out of said communication terminals, based on the relationship of the attitude status between said communication terminals.

The present invention is a program of a communication terminal in a communication system comprising communicating policy determining means that determines, based on a relationship of an attitude status between the communication terminals, a communication policy to be applied between said communication terminals, causing the communication terminal to execute: attitude status detecting process of detecting an attitude status of its own communication terminal; receiving process of receiving the attitude status of a communication destination communication terminal, being a communication destination, and an identifier of said communication destination communication terminal; relationship calculating process of calculating a relationship of the attitude status between said its own communication terminal and said communication destination communication terminal based on the attitude status of said its own communication terminal and the attitude status of said communication destination communication terminal; and transmitting process of transmitting said relationship of the attitude status, and the identifiers of said its own communication terminal and said communication destination communication terminal to said communication policy determining means.

The present invention is a program of a communication terminal in a communication system comprising communicating means that configures communication based on a predetermined policy between the communication terminals, causing the communication terminal to execute: attitude status detecting process of detecting an attitude status of its own communication terminal; receiving process of receiving the attitude status of a communication destination communication terminal, being a communication destination, and an identifier of said communication destination communication terminal; relationship calculating process of calculating a relationship of the attitude status between said its own communication terminal and said communication destination communication terminal based on the attitude status of said its own communication terminal and the attitude status of said communication destination communication terminal; communication policy determining process of determining a communication policy to be applied between said its own communication terminal and said communication destination communication terminal based on said relationship of the attitude status; and transmitting process of transmitting said communication policy, and the identifiers of said its own communication terminal and said communication destination communication terminal to said communicating means.

The present invention is a program of a communication terminal, causing the communication terminal to execute: attitude status detecting process of detecting an attitude status of its own communication terminal; receiving process of receiving the attitude status of a communication destination communication terminal, being a communication destination, and an identifier of said communication destination communication terminal; relationship calculating process of calculating a relationship of the attitude status between said its own communication terminal and said communication destination communication terminal based on the attitude status of said its own communication terminal and the attitude status of said communication destination communication terminal; communication policy determining process of determining a communication policy to be applied between said its own communication terminal and said communication destination communication terminal based on said relationship of the attitude status; and communicating process of performing communication based on said communication policy between said its own communication terminal and said communication destination communication terminal.

Advantageous Effect of Invention

The present invention makes it possible to deciding a policy in a simplified manner and performing communication when performing the communication having the policy reflected therein.

BRIEF DESCRIPTION OF DRAWINGS

FIG. 8 is a view illustrating one example a data table stored in each transmission data determiner 14 of a mobile telephone A and a mobile telephone B.

FIG. 9 is a view for explaining the first exemplary embodiment.

FIG. 20 is a view illustrating one example of the data table stored by a policy determiner 150 in the fourth exemplary embodiment.

FIG. 23 is a view illustrating one example a correspondence table stored by a policy determiner 150.

FIG. 24 is a view illustrating one example of another correspondence table stored by the policy determiner 150.

FIG. 28 is a view illustrating an example stored by a group information storage unit 700.

FIG. 31 is a view illustrating one example of a schedule.

FIG. 32 is one example illustrating one example of contents stored by the group information storage unit 700.

FIG. 33 is a view for explaining an operation of the seventh exemplary embodiment.

DESCRIPTION OF EMBODIMENTS

The exemplary embodiments of the present invention will be explained.

Figure 1:
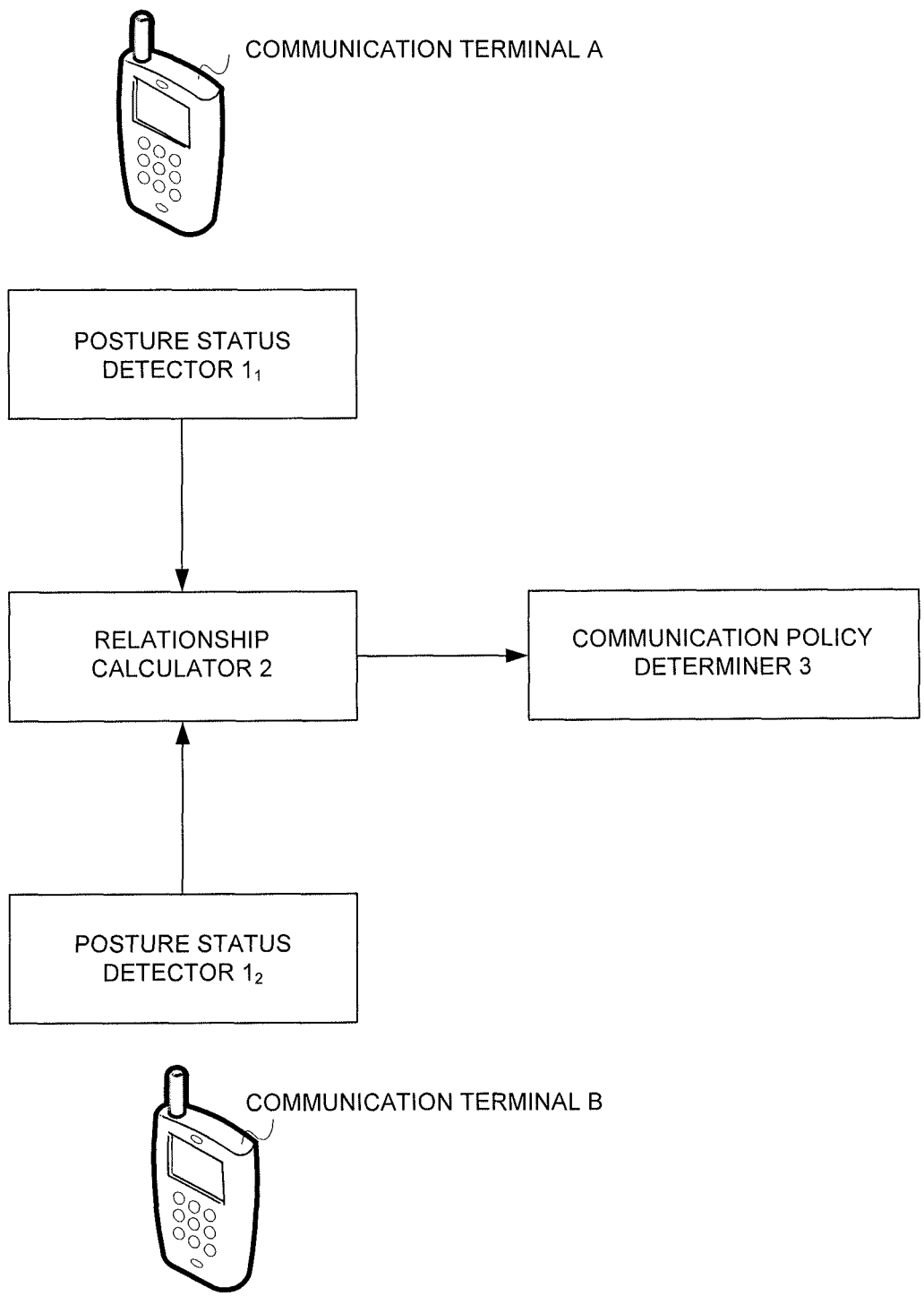
FIG. 1 is a block diagram illustrating an outline the exemplary embodiments of the present invention.

FIG. 1 is a block diagram illustrating an outline of the exemplary embodiments of the present invention.

In FIG. 1, each of $1_1$ and $1_2$ is a posture status detector, and 2 is a relationship calculator, and 3 is a communication policy determiner.

Figure 2:
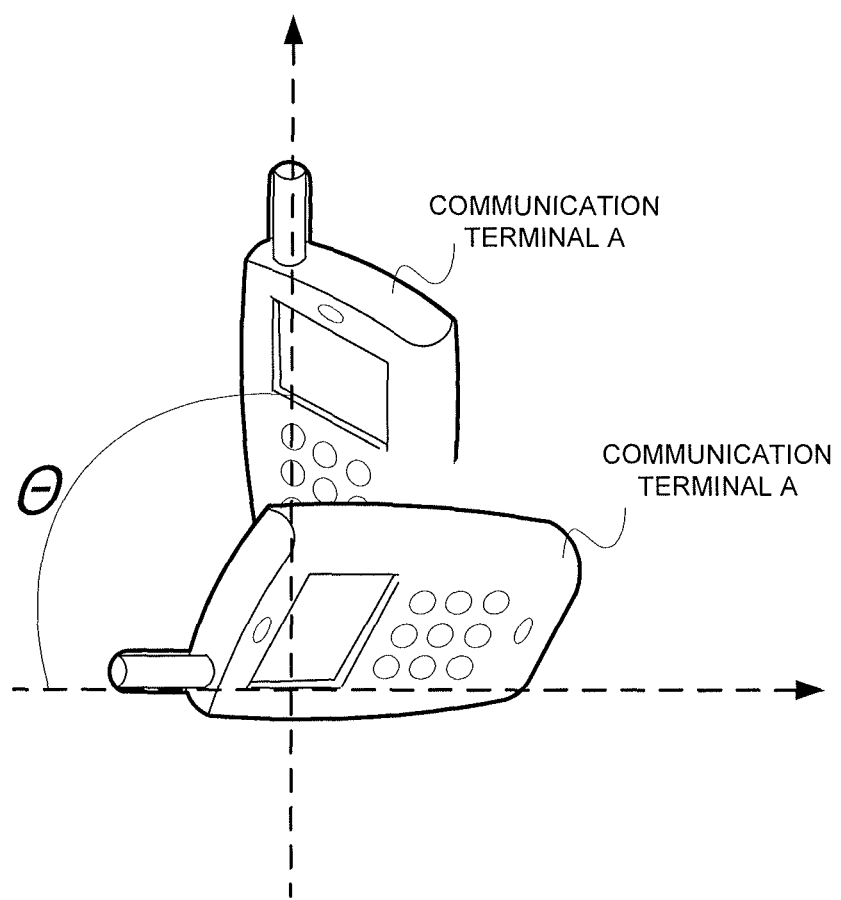
FIG. 2 is a view for explaining the exemplary embodiments of the present invention.
Figure 3:
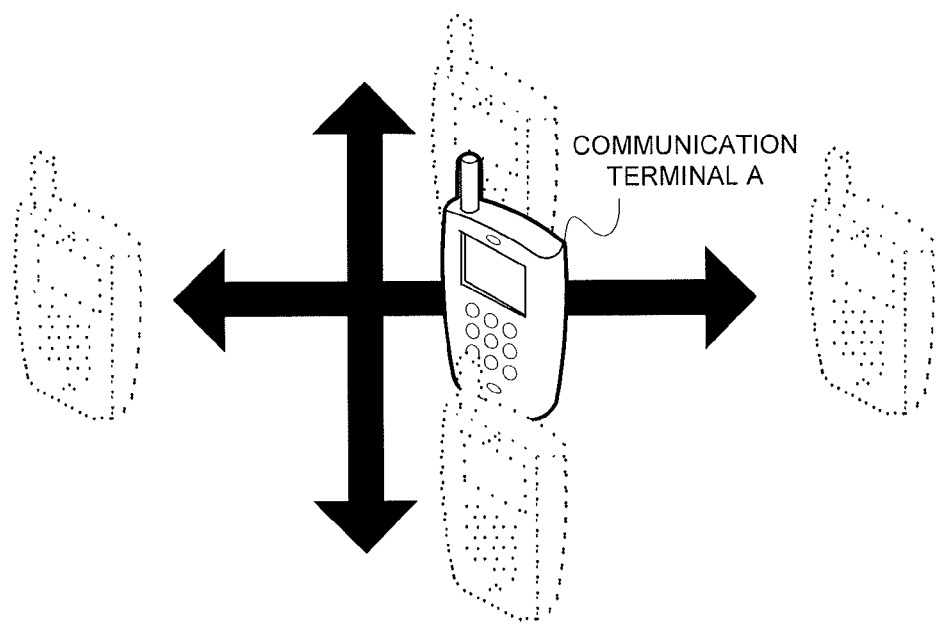
FIG. 3 is a view for explaining the exemplary embodiments of the present invention.
Figure 4:
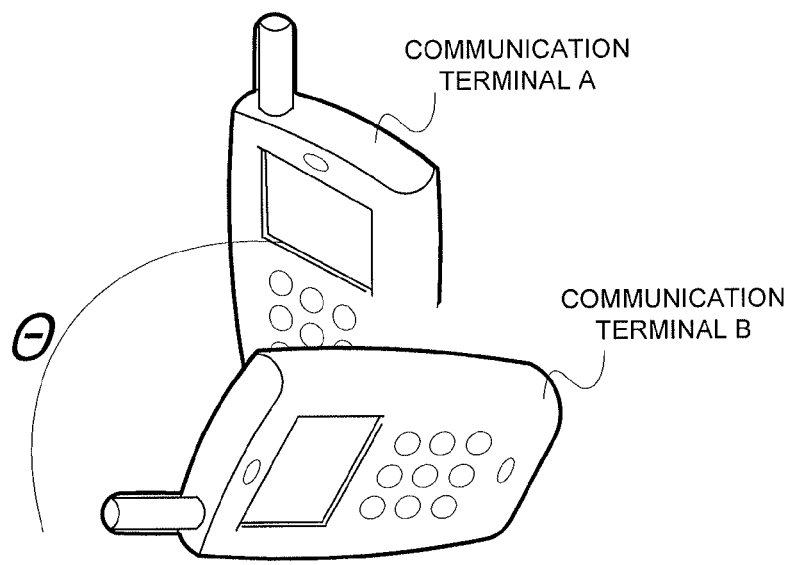
FIG. 4 is a view for explaining the exemplary embodiments of the present invention.
Figures 5, 6:
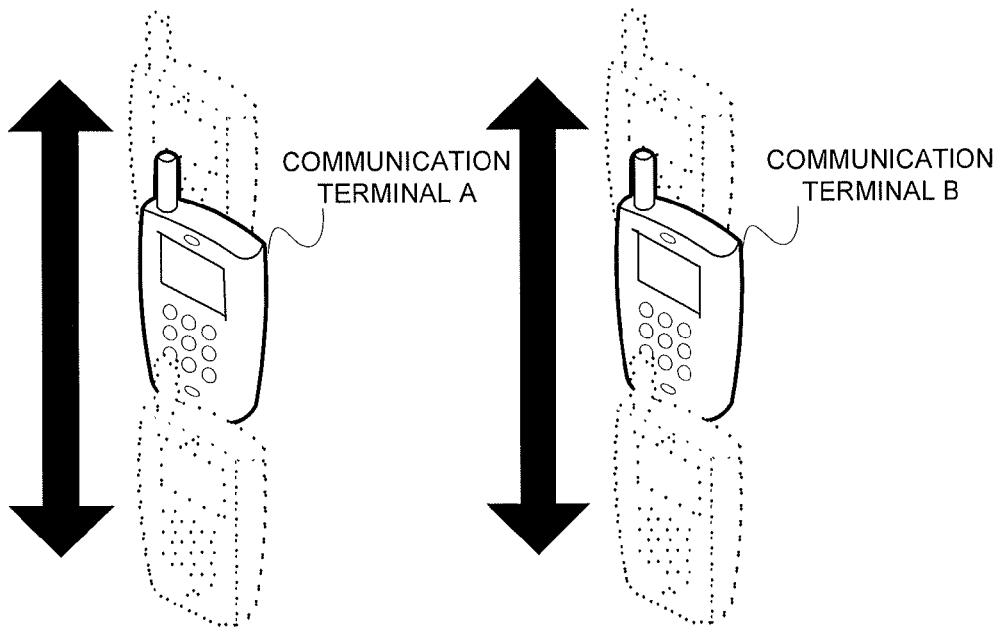
FIG. 5 is a view for explaining the exemplary embodiments of the present invention.
FIG. 6 is a view for explaining the exemplary embodiments of the present invention.

The posture status detector $1_1$ detects a posture status of a communication terminal A. The posture status detector $1_2$ detects a posture status of a communication terminal B. Herein, the so-called posture status of the communication terminal signifies how the communication terminal postures. For example, it signifies an inclination of the communication terminal A to a reference axis in a case of defining an axis that goes in a vertical direction from a ground as a reference, as shown in FIG. 2, and a status in which the communication terminal A is swung vertically and horizontally, as shown in FIG. 3, and the like. Additionally, the posture status detectors $1_1$ and $1_2$ may exist inside the communication terminal A and the communication terminal B, respectively, or may exist outside them, respectively The relationship calculator 2 calculates a relationship between the posture statuses of the communication terminals A and B based on the posture statuses of the communication terminals detected by the posture status detectors $1_1$ and $1_2$ respectively, Herein, the so-called relationship of the posture status signifies how the posture status is related between the communication terminals. For example, the relationship of the posture status is an angle that the communication terminals A and B form as shown in FIG. 4 when the posture status of the communication terminal is an inclination of the communication terminal. Further, the relationship of the posture status is the number of times each of the communication terminals A and B has been swung, and the like, as shown in FIG. 5 when the posture status of the communication terminal is a change in an acceleration. Additionally, it is enough for the relationship calculator 2 to exist in at least one of the communication terminals for performing communication, or is enough for the relationship calculator 2 to exist in an external server etc. capable of performing communication with the communication terminals.

The communication policy determiner 3 determines a communication policy of the communication between the communication terminals A and B based on the relationship of the posture status calculated by the relationship calculator 2.

Herein, the so-called communication policy is a disclosure level, an anonymity level, a term of validity, and a disclosure scope of the information to be transmitted to the communication destination, and the like. Further, a combination thereof may be defined as one communication policy.

Herein, the so-called disclosure level is a level as to an extent in which the user's information is disclosed, and for example, is a scope that is disclosed responding to the levels such as "only the name", "the name and the telephone number", and "the name, the telephone number, and the mail address"

Further, the so-called anonymity level is a scope of the users and the communication terminals that can utilize a newly prepared contact address. For example, as an example of the anonymity level, there exist real-name communication, pseudonym communication, anonymity communication and the like. In a case of the real-name communication, with regard to the contact address, any communication terminal can utilize the above contact address. Further, in a case of the pseudonym communication, the contact address is utilizable within a group to which the communication terminal of the partner to which the above contact address has been notified belongs; however, utilization by the communication terminal that does not belong to the group is restricted. Further, in a case of the anonymity communication, the contact address is utilizable only by the communication terminal of the partner to which the above contact address has been notified.

Further, the so-called term of validity is a period during which the communication with the communication terminal of the communication destination can be performed, an expiration time of information transmitted to the communication destination, and the like.

Further, the so-called disclosure scope is a scope in which the information being transmitted is disclosed.

The communication policy determiner 3, which has a correspondence table between the above-described communication policy and the relationship of the posture status, determines the communication policy corresponding to the relationship of the posture status. FIG. 6 is a view illustrating one example of the correspondence table, in which the posture status relationship (angle) and the communication policy (disclosure level) are caused to correspond to each other. For example, when the posture status relationship (angle) is 90 degree, the communication policy determiner 3 determines the name and the mail address as the communication policy (disclosure level). Additionally, it is enough for the communication policy determiner 3 to exist in at least one of the communication terminals for performing communication, or it is enough for the communication policy determiner 3 to exist in an external server etc. capable of performing communication with the communication terminals.

In such a manner, this exemplary embodiment makes it possible to determine the communication policy without necessitating complicated processes by the communication terminal when performing communication between the communication terminals.

Specific exemplary embodiments will be explained below.
<First Exemplary Embodiment>

In the first exemplary embodiment, the case will be explained of swinging two mobile telephones together, and changing the disclosure level (openness degree) of data to be exchanged between the two mobile telephones according to the number of times of the above swings. Specifically, an example will be explained of transmitting to the mobile telephone of the partner, the name when the mobile telephones are swing three times, the name and the telephone number when the mobile telephones are swing seven times, the name, the telephone number, and the mail address when the mobile telephones are swing fifteen times.

Figure 7:
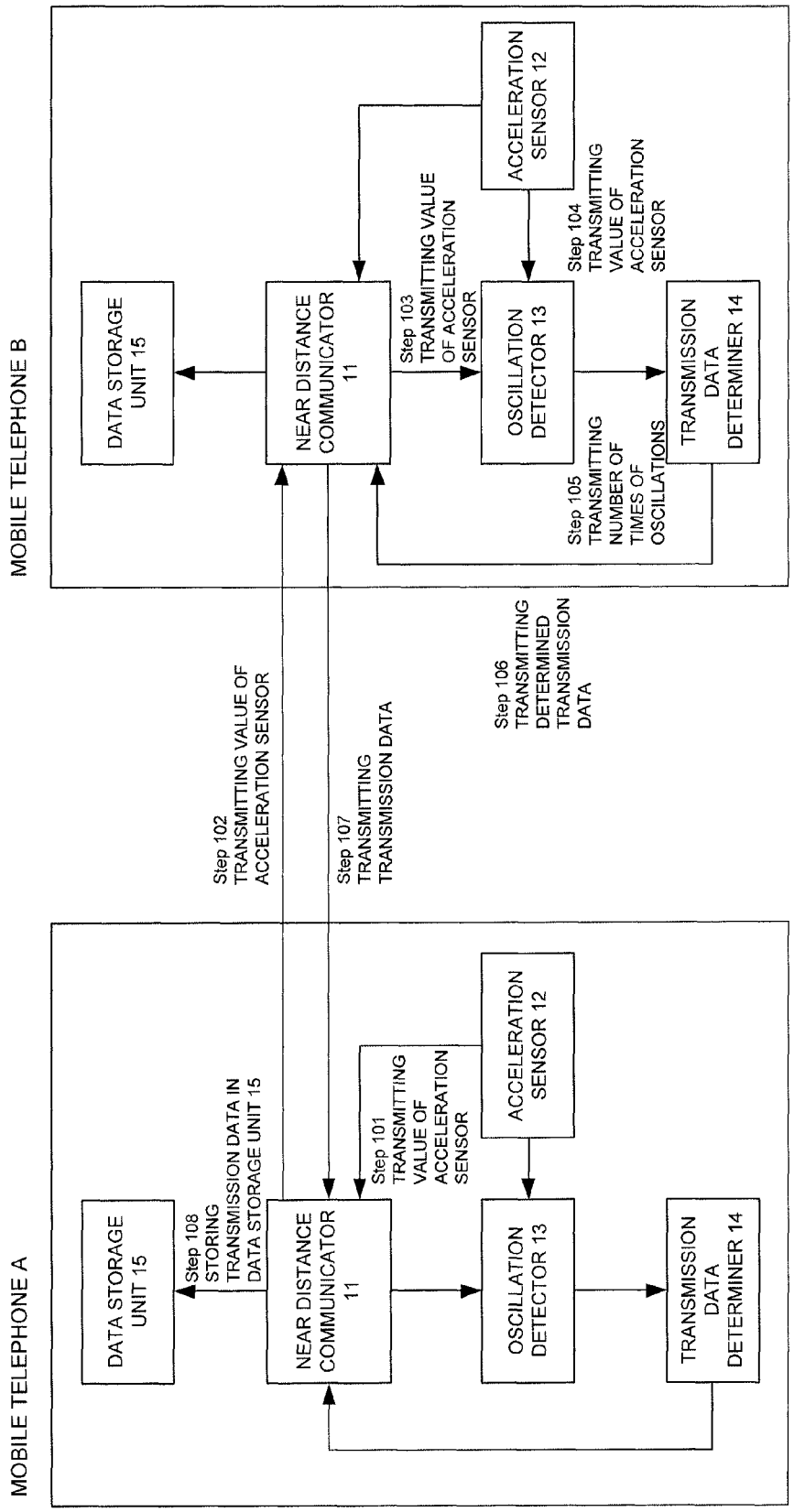
FIG. 7 is a block diagram illustrating a constitution example of a first exemplary embodiment.

FIG. 7 is a block diagram illustrating a constitution example of a first exemplary embodiment.

As shown in FIG. 7, there exists a mobile telephone A and a mobile telephone B that different users joining a telecommunications carrier own, respectively.

Each of the mobile telephone A and the mobile telephone B includes a near distance communicator 11 for performing communication with the near mobile telephoned without going through a network, an acceleration sensor 12 for acquiring an acceleration of the mobile telephone, an oscillation detector 13 for comparing a value of the acceleration sensor of its own mobile telephone and that of the acceleration sensor of the mobile telephone of the communication partner received by the near distance communicator 11, and calculating the number of times its own mobile telephone and the communication destination mobile telephone have been swung together, a transmission data determiner 14 for storing the transmission data corresponding to the number of times they have been swung together, and determining the transmission data corresponding to the number of times they have been swung together, and a data storage unit 15 for storing the data received from the communication destination.

Additionally, the acceleration sensor 12 is equivalent to the posture status detector, the oscillation detector 13 is equivalent to the relationship calculator, and the transmission data determiner 14 is equivalent to the communication policy determiner.

FIG. 8 is a view illustrating one example of the data table stored in the transmission data determiner 14 of each of the mobile telephone A and the mobile telephone B, FIG. 8 (a) is a view illustrating the data table stored in the transmission data determiner 14 of the mobile telephone A, and FIG. 8 (b) is a view illustrating the data table stored in the transmission data determiner 14 of the mobile telephone B. The data table of FIG. 8 has a scope of the number of times of the oscillations calculated by the oscillation detector 13 and the transmission data corresponding to the above number of times of the oscillations stored correspondingly to each other therein. For example, in the data table stored in the transmission data determiner 14 of the mobile telephone B shown in FIG. 8 (b), the case of the number of times of 1 to 5 and a name "Bob" are caused to correspond to each other, the case of the number of times of 6 to 10, the name "Bob", and a telephone number "090-1111-2222" are caused to correspond to each other, and the case of the number of times of 11 and more, the name "Bob", the telephone number "090-1111-2222", and a mail address "bob@carrier.com" are caused to correspond to each other.

Next, an operation of the first exemplary embodiment will be explained using FIG. 7.

At first, as shown in FIG. 9, it is assumed that the mobile telephone A and the mobile telephone B are together swung.

The value of the acceleration sensor is transmitted from the acceleration sensor 12 within the mobile telephone A to the near distance communicator 11 (Step 101 of FIG. 7). Additionally, it does not matter that the timing in which the value is transmitted is a timing in which an owner of the mobile telephone has started a private application etc., a timing in which the near distance communicator has sensed that the communication partner exists closely hereto, and a timing in which the value of the acceleration sensor has exceeded a threshold (a threshold for making it possible to recognize that the mobile telephone has been intentionally swung by a human being).

The mobile telephone A transmits the acquired value of the acceleration sensor from the near distance communicator 11 to the mobile telephone B (Step 102 of FIG. 7).

The mobile telephone B receives the value of the acceleration sensor of the mobile telephone A from the near distance communicator 11, and transmits it to the oscillation detector 13 (Step 103 of FIG. 7).

The value of the acceleration sensor of the mobile telephone B is transmitted from the acceleration sensor 12 within the mobile telephone B to the near distance communicator 11 (Step 104 of FIG. 7).

The oscillation detector 13 of the mobile telephone B compares the value of the acceleration sensor of the mobile telephone A and that of the acceleration sensor of the mobile telephone B, and judges whether or not both have been swung together (judges whether or not both have been synchronized with each other), and calculates the number of times both have been swung together (hereinafter, the number of times of the oscillations). Herein, when it is assumed that the mobile telephone A and the mobile telephone B have been swung six times together, the oscillation detector 13 of the mobile telephone B detects that the number of times of the oscillations is "6" because the numbers of times of the oscillations of the mobile telephone A and mobile telephone B are "6", respectively. And, the oscillation detector 13 transmits this number of times of the oscillations, being "6", to the transmission data determiner 14 of the mobile telephone B (Step 105 of FIG. 7).

The transmission data determiner 14 of the mobile telephone B determines the transmission data to be transmitted to the mobile telephone of the partner based on the stored data table. In the above-described example, the number of times of the oscillations received from the oscillation detector 13 of the mobile telephone B is "6", whereby the transmission data to be transmitted from the mobile telephone B to the mobile telephone A is the name "Bob", and the telephone number "090-1111-2222" according to an example of the data table of FIG. 8 (b). Thus, the transmission data determiner 14 of the mobile telephone B transmits the name "Bob" and the telephone number "090-1111-2222" to the near distance communicator 11 (Step 106 of FIG. 7).

The near distance communicator 11 of the mobile telephone B transmits the name "Bob" and the telephone number "090-1111-2222" to the mobile telephone A (Step 107 of FIG. 7).

The near distance communicator 11 of the mobile telephone A receives the name "Bob" and the telephone number "090-1111-2222" and stores them in the data storage unit 15 (Step 108 of FIG. 7).

While an example of transmitting the data based on the communication policy from the mobile telephone B to the mobile telephone A was explained in the above-described explanation, the data based on the communication policy may be transmitted from the mobile telephone A to the mobile telephone B. In this case, the mobile telephone A performs a process similar to the process that is performed by the mobile telephone B. Further, both of the mobile telephone A and the mobile telephone B may perform the similar process to exchange the data. In this case, with an order of the operation of the mobile telephone A and the mobile telephone B, the mobile telephone A may firstly perform it or the mobile telephone B firstly performs it, or the mobile telephone A and the mobile telephone B may perform it simultaneously.

Further, a confirmer for confirming that the mobile telephone A has received the data coming from the mobile telephone B, the mobile telephone B has received the data coming from the mobile telephone A, and mutual data has been exchanged may be provided.

This exemplary embodiment is capable of transmitting the information responding to the disclosure level of the communication partner to the communication terminal of the communication partner with a simple maneuver.

<Second Exemplary Embodiment>

The second exemplary embodiment will be explained.

The second exemplary embodiment is an example of exchanging the telephone number by holding up the angled mobile telephone over the fixed non-contact type card reader. That is, in this exemplary embodiment, an example will be described of changing the telephone number to be exchanged, according to an angle that the non-contact type card reader and the mobile telephone form. For example, in a case in which the mobile telephone is 2in1, the number is switched when the angle is 0 degree and the angle is 90 degree.

Figure 10:
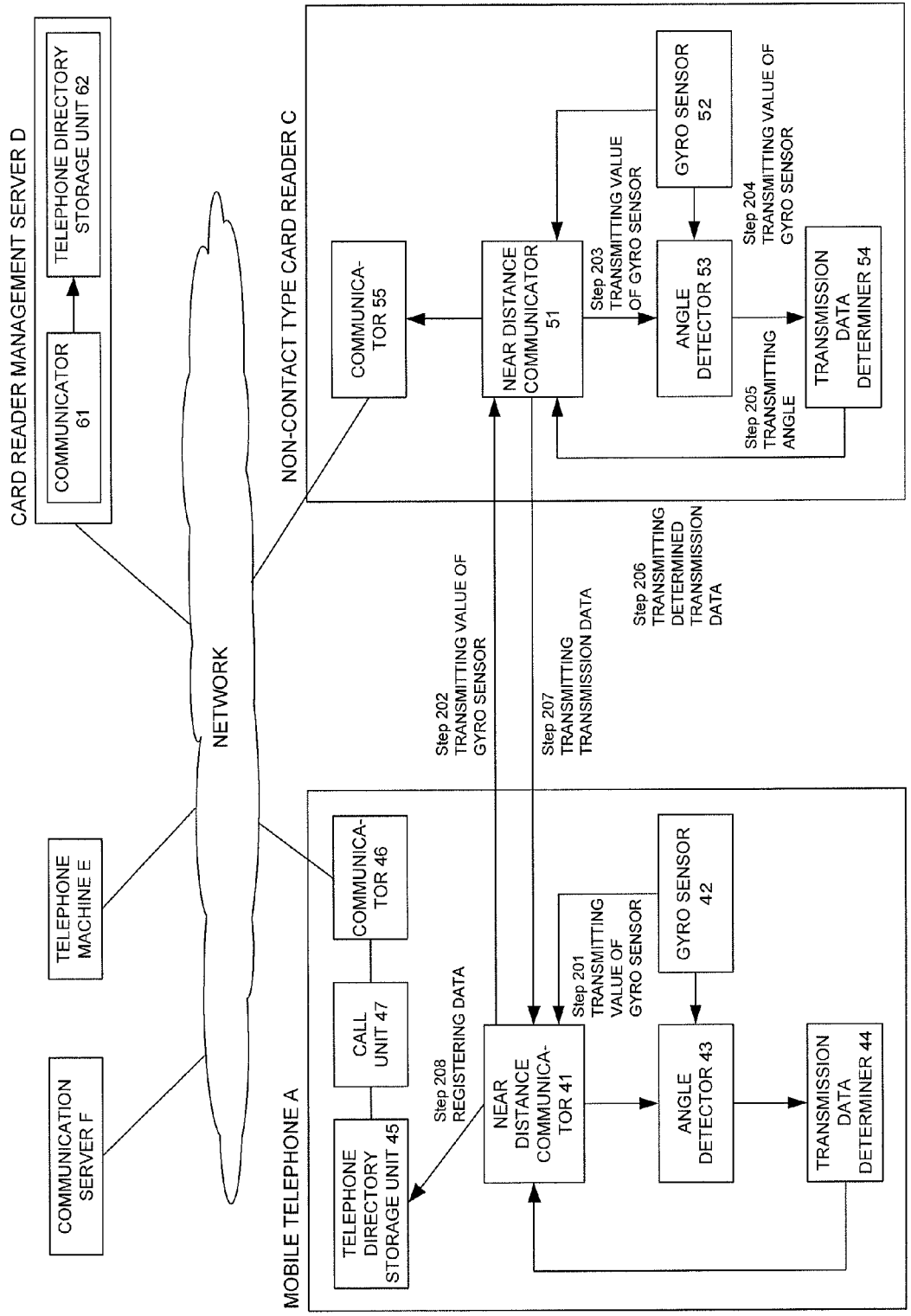
FIG. 10 is a block diagram illustrating a constitution example of a second exemplary embodiment.

FIG. 10 is a block diagram illustrating a constitution example of the second exemplary embodiment.

As shown in FIG. 10, a mobile telephone A that the user joining the telecommunications carrier owns, a non-contact type card reader C, a card reader management server D, a telephone machine E, and a communication server F are connected via a network.

The mobile telephone A includes a near distance communicator 41 for performing communication with the non-contact type card reader C that exists closely hereto without going through the network, a gyro censor 42 for detecting an inclination of the mobile telephone A, an angle detector 43 for comparing the value of the gyro censor within the mobile telephone A, and that of the gyro censor of the non-contact type card reader C received by the near distance communicator 41, and calculating an angle that the mobile telephone A and the non-contact type card reader C form from an inclination between the mobile telephone A and the non-contact type card reader C, a transmission data determiner 44 for storing the transmission data corresponding to the angle that the mobile telephone A and the non-contact type card reader C form, and determining the transmission data corresponding to the angle, a telephone directory storage unit 45 for storing the received data, a communicator 46 for performing communication via the network, and a call unit 47 for making a telephone call.

Figures 11, 12:
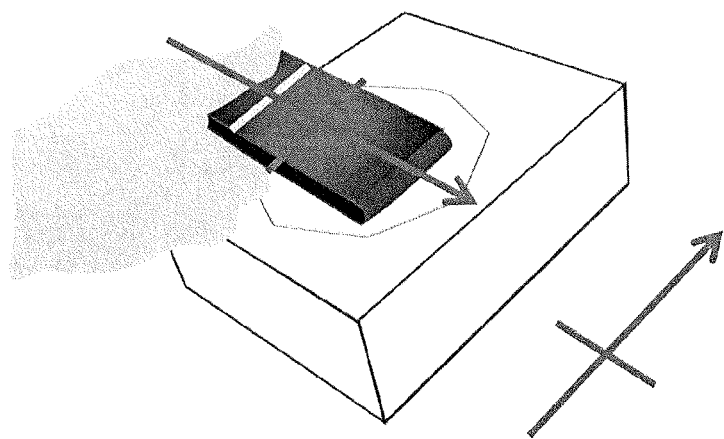
FIG. 11 is a view illustrating one example of the data table stored in each transmission data determiner of the mobile telephone A and a non-contact type card reader C.
FIG. 12 is a view for explaining the second exemplary embodiment.

FIG. 11 is a view illustrating one example of the data table stored in the transmission data determiner of each of the mobile telephone A and the non-contact type card reader C, FIG. 11 (a) is a view illustrating the data table stored in the transmission data determiner 44 of the mobile telephone A, and FIG. 11 (b) is a view illustrating the data table stored in the transmission data determiner 54 of the non-contact type card reader C.

The data table of FIG. 11 has the angle calculated by the angle detector and the telephone number stored correspondingly to each other therein. For example, in the data table stored in the transmission data determiner 44 of the mobile telephone A shown in FIG. 11(a), the case in which the angle is zero degree and a telephone number "090-8765-4321" are caused to correspond to each other, and the case in which the angle is 90 degree and a telephone number "090-9876-5432" are caused to correspond to each other. Additionally, it is assumed that this data (telephone number), which is under contract with the telecommunications carrier, is a valid telephone number that is ready for the calling.

The non-contact type card reader C includes a near distance communicator 51 for performing communication with the mobile telephone A that exists closely hereto without going through the network, a gyro censor 52 for detecting an inclination of the non-contact type card reader C, an angle detector 53 for comparing the value of the gyro censor within the non-contact type card reader C and that of the gyro censor of the mobile telephone A received by the near distance communicator 51, and calculating an angle that the mobile telephone A and the non-contact type card reader C form from an inclination between the mobile telephone A and the non-contact type card reader C, a transmission data determiner 54 for storing the transmission data corresponding to the angle that the mobile telephone A and the non-contact type card reader C form, and determining the transmission data corresponding to the angle, and a communicator 55 for performing communication via the network.

The card reader management server D, which includes a communicator 61 and a telephone directory storage unit 62, stores the reception data of the mobile telephone A coming from the non-contact type card reader C by the communicator 61 in the telephone directory storage unit 62.

FIG. 12 is a view illustrating an example of holding up the mobile telephone A and the non-contact type card reader C with both angled. In FIG. 12, the angle is 90 degree.

Next, an operation of the second exemplary embodiment will be explained using FIG. 10, FIG. 13, and FIG. 14. Additionally, in the following explanation, as shown in FIG. 12, the case of holding up the mobile telephone A over the non-contact type card reader C at an angle of 90 degree will be explained. Further, it is assumed that a manager of the card reader management server D maintains the telephone machine E.

At first, an operation of transmitting the data of the non-contact type card reader C to the mobile telephone will be explained using FIG. 10.

The value of the gyro sensor 42 is transmitted from the gyro sensor 42 within the mobile telephone A to the near distance communicator 41. It does not matter that the timing in which the value is transmitted is a timing in which an owner of the mobile telephone A has started a private application etc., and a timing in which the near distance communicator 41 has sensed that the communication partner exists closely hereto. The gyro sensor 52 of the non-contact type card reader C is also started to transmit the value to the near distance communicator (Step 201 of FIG. 10).

The value received from the gyro sensor 42 of the mobile telephone A is transmitted from the near distance communicator 41 of the mobile telephone A to the near distance communicator 51 of the non-contact type card reader C (Step 202 of FIG. 10).

The received value of the gyro sensor of the mobile telephone A is transmitted from the near distance communicator 51 of the non-contact type card reader C to the angle detector 53 (Step 203 of FIG. 10).

The value of the gyro sensor is transmitted from the gyro sensor 52 of the non-contact type card reader C to the angle detector 53. Additionally, it does not matter that the timing in which the value is transmitted is a timing in which the value of the gyro sensor has been received from the mobile telephone A, and the data may be always transmitted at a constant interval (Step 204 of FIG. 10).

The angle detector 53 of the non-contact type card reader C compares the value of the gyro censor of the mobile telephone A with that of the gyro censor of the non-contact type card reader C, and calculates an angle that the mobile telephone A and the non-contact type card reader C form. Herein, it is assumed that the angle calculated by the angle detector 53 is "90". The angle detector 53 transmits the calculated angle "90" to the transmission data determiner 54 (Step 205 of FIG. 10).

The transmission data determiner 54 of the non-contact type card reader C retrieves the data corresponding to the angle "90" received from the angle detector 53 from the stored data table. In an example of FIG. 11 (b), the data corresponding to the angle "90" is "03-2468-1357". Thus, the transmission data determiner 54 determines that the data to be transmitted is "03-2468-1357". And, the transmission data determiner 54 transmits the determined data "03-2468-1357" to the near distance communicator 51 (Step 206 of FIG. 10).

The determined data "03-2468-1357" is transmitted from the non-contact type card reader C to the near distance communicator 41 of the mobile telephone A (Step 207 of FIG. 10).

The near distance communicator 41 of the mobile telephone A receives "03-2468-1357" from the non-contact type card reader C, and transmits the data "03-2468-1357" to the telephone directory storage unit 45. And, the data "03-2468-1357" is stored in the telephone directory storage unit 45 (Step 208 of FIG. 10).

Next, an operation at the time of transmitting the data from the mobile telephone A to the non-contact type card reader C will be explained using FIG. 13.

Figure 13:
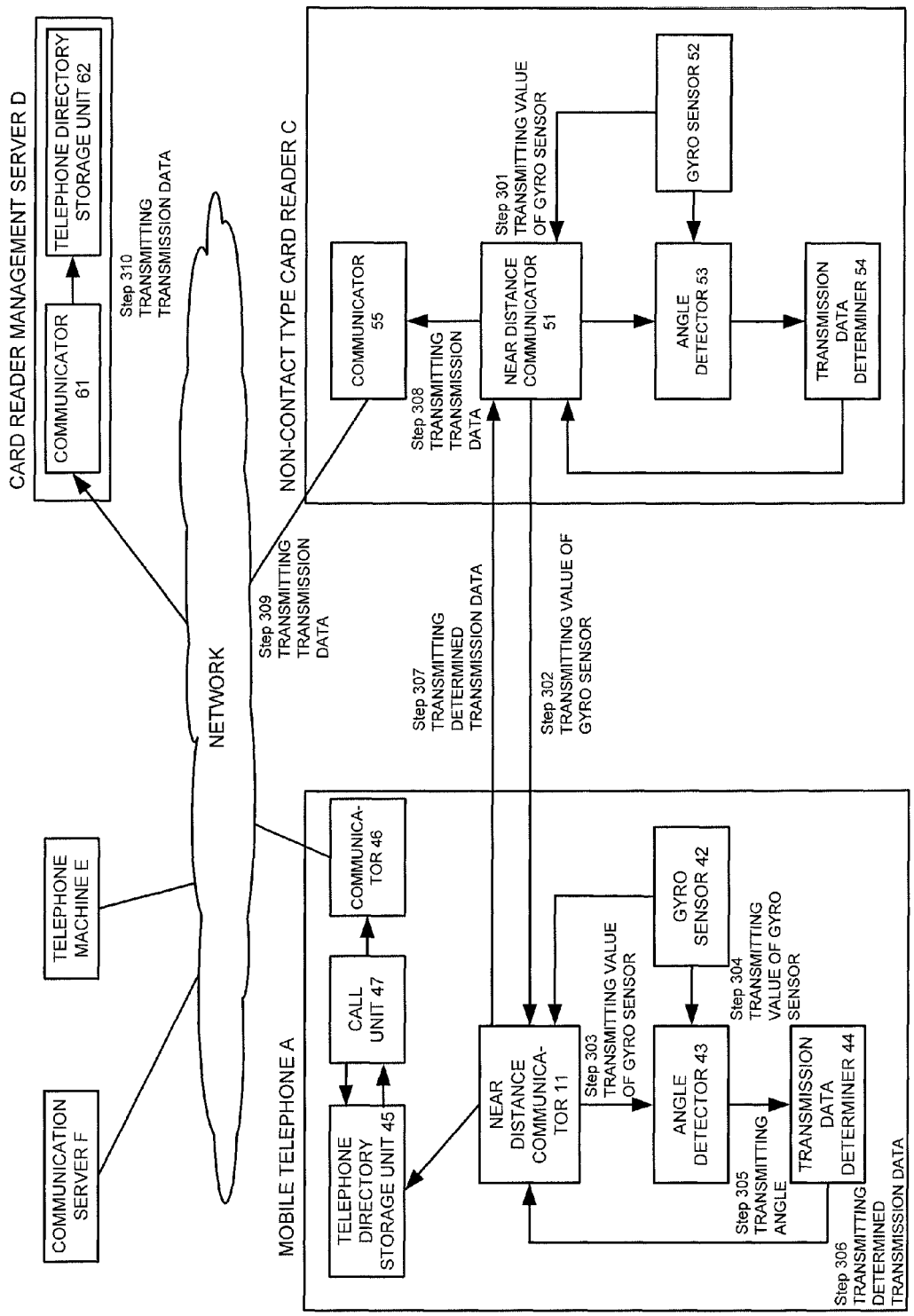
FIG. 13 is a view for explaining the second exemplary embodiment.

The value of the gyro sensor is transmitted from the gyro sensor 52 within the non-contact type card reader C to the near distance communicator 51 (Step 301 of FIG. 13).

The value received from the gyro sensor of the non-contact type card reader C is transmitted from the non-contact type card reader C to the mobile telephone A (Step 302 of FIG. 13).

The received value of the gyro sensor of the non-contact type card reader C is transmitted from the near distance communicator 41 of the mobile telephone A to the angle detector 43 (Step 303 of FIG. 13).

The value of the gyro sensor is transmitted from the gyro sensor 42 of the mobile telephone A to the angle detector 43 (Step 304 of FIG. 13).

The angle detector 43 compares the value of the gyro censor of the mobile telephone A with that of the gyro censor of the non-contact type card reader C, and calculates an angle that the mobile telephone A and the non-contact type card reader C form. Herein, it is assumed that the angle calculated by the angle detector 43 is "90". The angle detector 43 transmits the calculated angle "90" to the transmission data determiner 44 (Step 305 of FIG. 13).

The transmission data determiner 44 retrieves the data corresponding to the angle "90" received from the angle detector 43 from the stored data table. In an example of FIG. 11 (a), the data corresponding to the angle "90" is "090-9876-5432". Thus, the transmission data determiner 44 determines that the data to be transmitted is "090-9876-5432". And, the transmission data determiner 44 transmits the determined data "090-9876-5432" to the near distance communicator 41 (Step 306 of FIG. 13).

The determined data "090-9876-5432" is transmitted from the mobile telephone A to the near distance communicator 51 of the non-contact type card reader C (Step 307 of FIG. 13).

The near distance communicator 51 of the non-contact type card reader C transmits the received data "090-9876-5432" to the communicator 55 (Step 308 of FIG. 13).

The communicator 55 of the non-contact type card reader C transmits the determined data "090-9876-5432" of the mobile telephone A to the communicator 61 of a card reader management server D (Step 309 of FIG. 13).

The communicator 61 of the card reader management server D transmits the received data "090-9876-5432" to the telephone directory storage unit 62. And, the received data "090-9876-5432" is stored in the telephone directory storage unit 62 (Step 310 of FIG. 13).

Continuously, an operation in a case of making a telephone call from the mobile telephone A using the exchanged telephone number will be explained by using FIG. 14.

Figure 14:
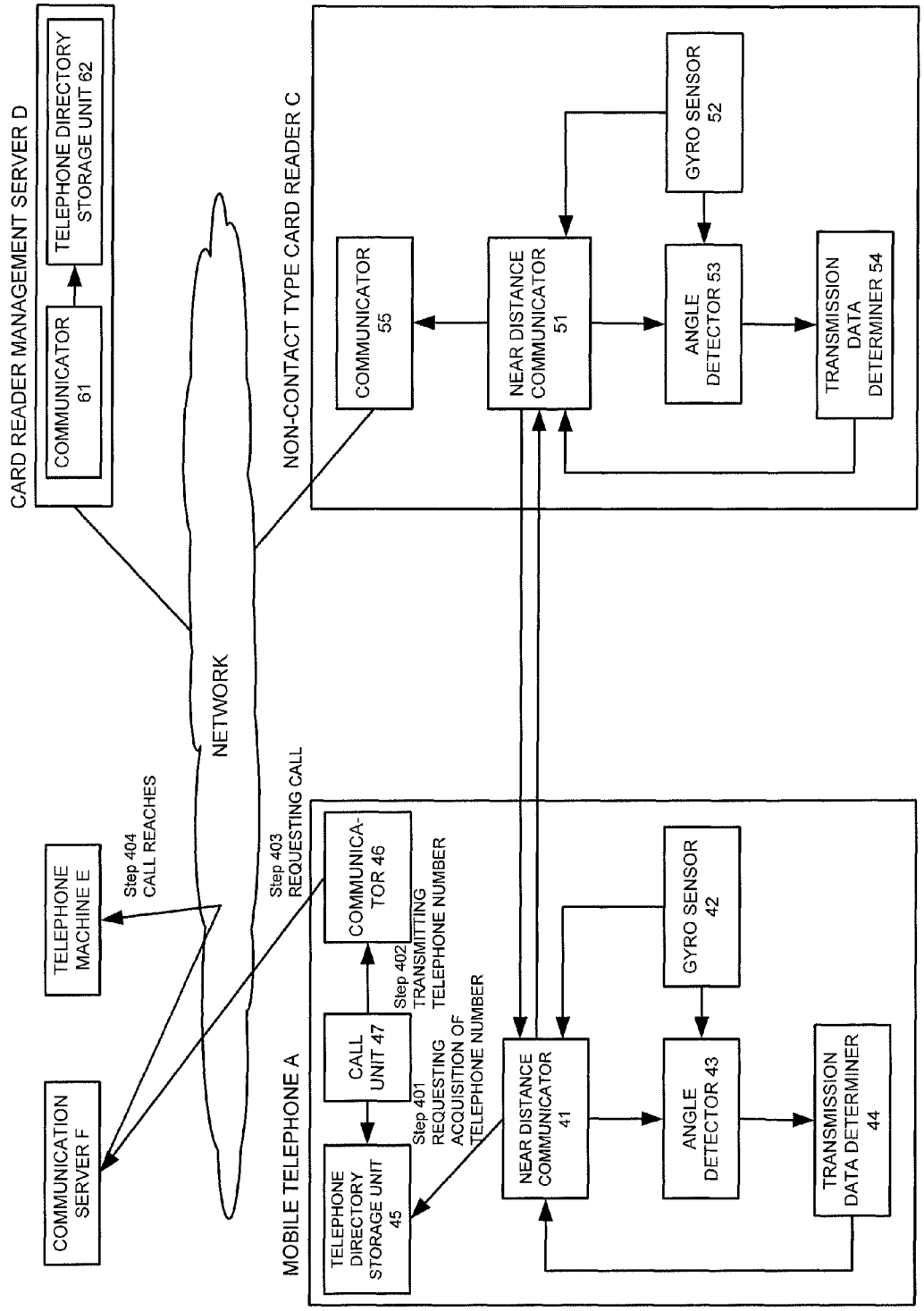
FIG. 14 is a view for explaining the second exemplary embodiment.

The call unit 47 of the mobile telephone A makes an acquisition request of the telephone number acquired from the non-contact type card reader C to the telephone directory storage unit 45 (Step 401 of FIG. 14).

The telephone directory storage unit 45 transmits the telephone number "03-2468-1357" acquired from the stored non-contact type card reader C to the call unit 47 (Step 402 of FIG. 14).

The call unit 47 makes a telephone call request (a request for establishing a session) to the communicator 46 using the telephone number "03-2468-1357" via a call server F (Step 403 of FIG. 14).

The telephone number "03-2468-1357" reaches at the telephone machine E assigned by the telecommunications carrier (Step 404 of FIG. 14).

Additionally, the situation is similar with the case of making a telephone call to the mobile telephone A from the card reader management server D. Further, in the above-described operation, with an order of the operation of the mobile telephone A and the non-contact type card reader C, the mobile telephone A may firstly performs it or the non-contact type card reader C may firstly performs it, and the mobile telephone A and the non-contact type card reader C may perform it simultaneously. Further, the data may be stored after confirming the data exchange by mounting a confirmer for confirming that the mobile telephone A has received the data coming from the non-contact type card reader C, the non-contact type card reader C has received the data coming from the mobile telephone A, and the mutual data has been exchanged. Further, as another example, this exemplary embodiment can be also utilized for a service of exchanging information between the mobile telephone having a plurality of credit numbers filed therein and the non-contact type card reader. In this case, for example, it is possible to transmit the credit number selected according to an angle between the mobile telephone and the non-contact type card reader from the mobile telephone to the non-contact type card reader, and to transmit points that differ for each type of the credit from the non-contact type card reader to the mobile telephone.

<Third Exemplary Embodiment>

The third exemplary embodiment is an example of determining the communication policy according to the angle that two mobile telephones form, and generating the contact address based on the communication policy. In this exemplary embodiment, an example will be explained of delivering the telephone number that is valid for one hour when the angle is zero degree, and the telephone number that is valid for three days when the angle is 90 degree.

Figure 15:
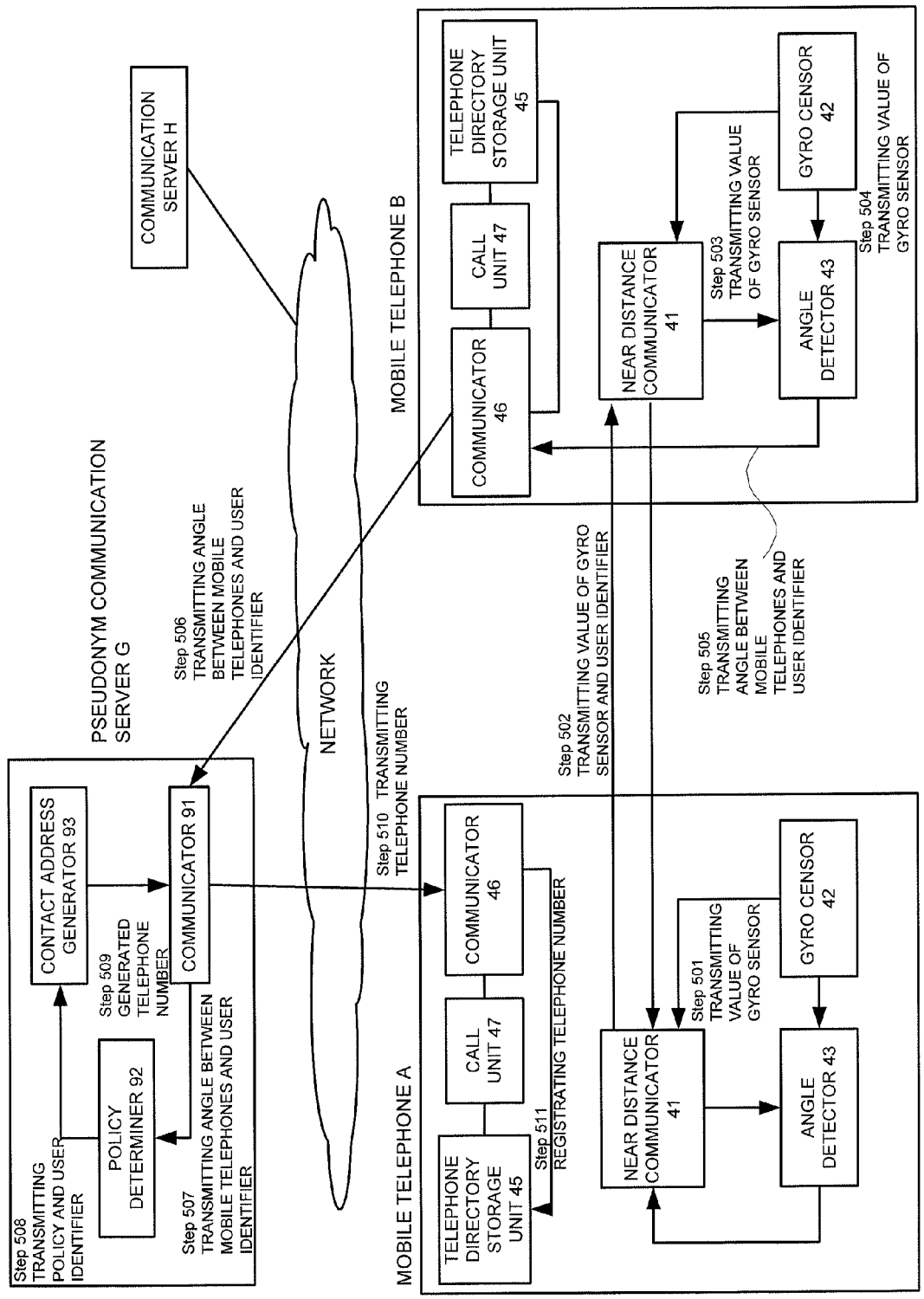
FIG. 15 is a block diagram illustrating a constitution example of a third exemplary embodiment.

FIG. 15 is a block diagram illustrating a constitution example of the third exemplary embodiment.

As shown in FIG. 15, a mobile telephone A and a mobile telephone B that the user joining the telecommunications carrier owns, a pseudonym communication server G, and a call server H are connected via the network. Additionally, the mobile telephone A and the mobile telephone B are similar to those of the above-described exemplary embodiments, so the detailed explanation is omitted.

The pseudonym communication server G includes a communicator 91 for performing communication with other communicating devices via the network, a policy determiner 92 for storing an angle that the mobile telephone A and the mobile telephone B form, and a policy corresponding to this angle, and determining the policy corresponding the angle, and a contact address generator 93 for generating the contact address according to the policy determined by the policy determiner 92.

Figures 16, 17:
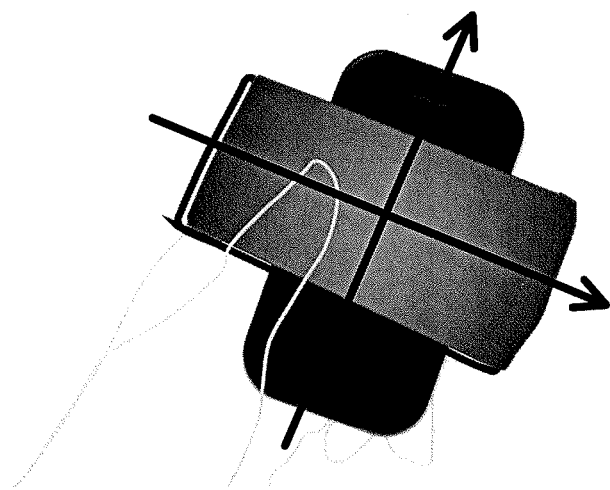
FIG. 16 is a view illustrating one example of the data table stored in a policy determiner 92.
FIG. 17 shows a status in which an angle that two mobile telephones of the mobile telephone A and the mobile telephone B form is 90 degree.

FIG. 16 is a view illustrating one example of the data table stored in the policy determiner 92. The angle calculated by the angle detector (the angle that the mobile telephone A and the mobile telephone B form) and an item of the policy are stored correspondingly to each other. For example, in FIG. 16, the angle of zero degree and the policy of being valid for one hour are caused to correspond to each other, the angle of 90 degree and the policy being valid for three days are caused to correspond to each other, and the angle of 180 degree and the policy of being valid for one week are caused to correspond to each other.

FIG. 17 is a view illustrating a status in which the angle that the mobile telephone A and the mobile telephone B form is 90 degree.

Next, an operation of the third exemplary embodiment will be explained using FIG. 15 and FIG. 18. Additionally, in the following operation, the case of delivering the contact address to the mobile telephone A will be explained.

The value of the gyro sensor is transmitted from the gyro sensor 42 within the mobile telephone A to the near distance communicator 41 (Step 501 of FIG. 15).

The near distance communicator 41 of the mobile telephone A transmits the value received from the gyro sensor of the mobile telephone A and a user identifier "user001" of the owner of the mobile telephone A to the mobile telephone B (Step 502 of FIG. 15).

The near distance communicator 41 of the mobile telephone B transmits the received value of gyro sensor of the mobile telephone A, and the user identifier "user001" of the mobile telephone A to the angle detector 43 (Step 503 of FIG. 15).

The gyro sensor 42 of the mobile telephone B transmits the value of the gyro sensor to the angle detector 43 (Step 504 of FIG. 15).

The angle detector 43 of the mobile telephone B compares the value of the gyro censor of the mobile telephone A with that of the gyro censor of mobile telephone B, and calculates an angle that the mobile telephone A and the mobile telephone B form. Herein, it is assumed that the angle that two mobile telephones of the mobile telephone A and the mobile telephone B form is in a status of being 90 degree as shown in FIG. 11, and the angle detector 43 calculates the angle "90". And, the angle detector 43 transmits the calculated angle "90" and the user identifier "user001" of the mobile telephone A to the communicator 46 (Step 505 of FIG. 15).

The communicator 46 of the mobile telephone B transmits the angle "90", the user identifier "user001" of the mobile telephone A, and a user identifier "user002" of the mobile telephone B to the communicator 91 of the pseudonym communication server G (Step 506 of FIG. 15).

The communicator 91 of the pseudonym communication server G transmits the received angle "90", user identifier "user001" of the mobile telephone A, and user identifier "user002" of the mobile telephone B to the policy determiner 92 (Step 507 of FIG. 15).

The policy determiner 92 of the pseudonym communication server G retrieves the policy corresponding to the angle "90" from the data table, and determines that the policy corresponding to the angle "90" is "being valid for three days". And, the policy determiner 92 transmits the policy "being valid for three days", the user identifier "user001", and the user identifier "user002" to the contact address generator 93 (Step 508 of FIG. 15).

The contact address generator 93 of the pseudonym communication server G generates the telephone number that is valid for three days between the received user identifier "user001" and user identifier "user002", for example, "03-9999-9999". And, the contact address generator 93 transmits the generated telephone number "03-9999-9999" to the communicator 91 (Step 509 of FIG. 15).

The communicator 91 of the pseudonym communication server G transmits the generated telephone number "03-9999-9999" to the communicator 46 of the mobile telephone A (Step 510 of FIG. 15).

The communicator 46 of the mobile telephone A transmits the received telephone number "03-9999-9999" to the telephone directory storage unit 45, and the telephone number "03-9999-9999" is stored in the telephone directory storage unit 45 (Step 511 of FIG. 15).

With an operation similar to the above-described operation, the telephone number that is valid for three days with the mobile telephone A is stored in the telephone directory storage unit 45 of the mobile telephone B as well.

Continuously, an operation in a case of making a telephone call to the mobile telephone A from the mobile telephone B will be explained by using FIG. 18.

Figure 18:
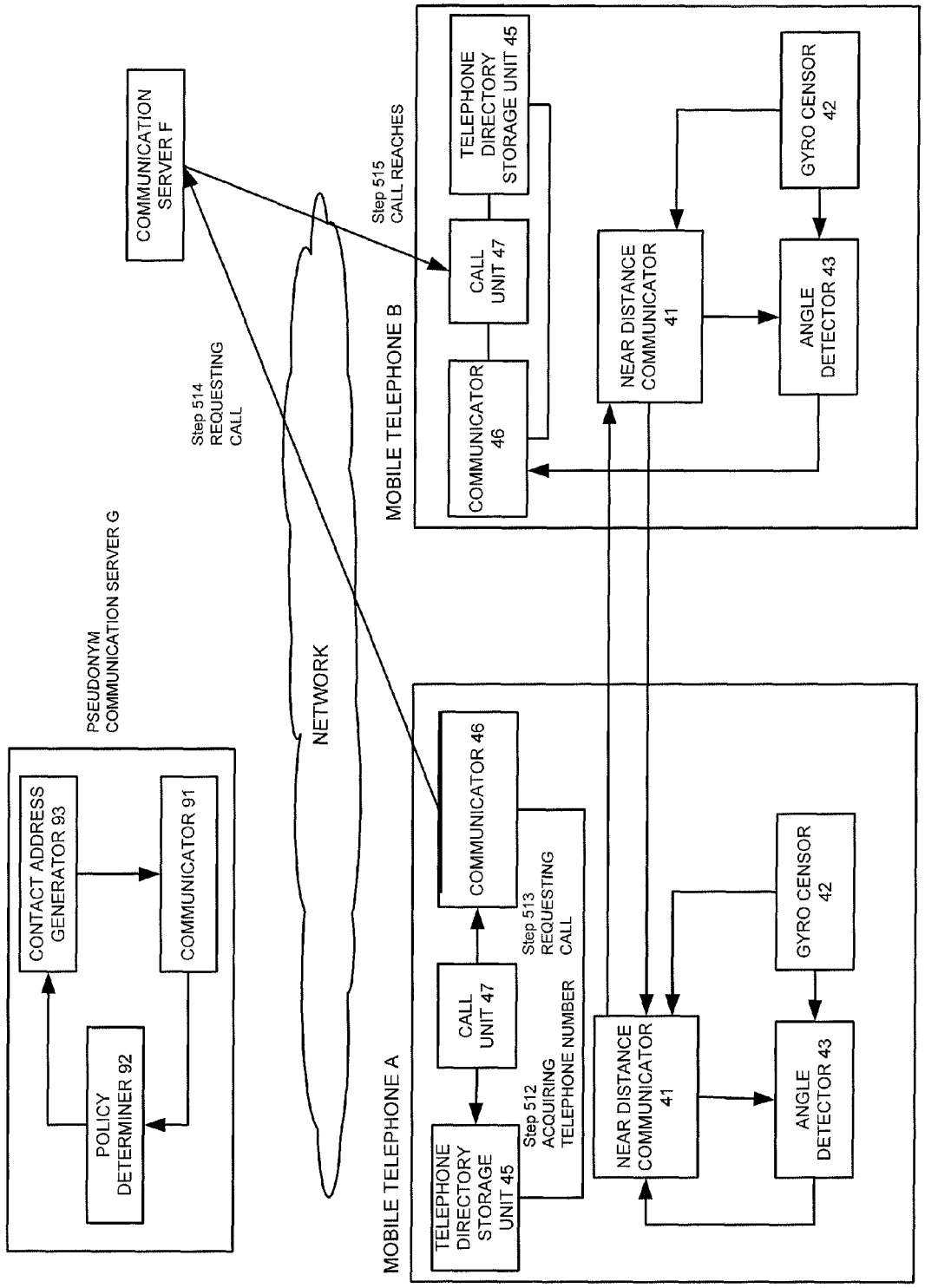
FIG. 18 is a view for explaining a third exemplary embodiment.

The telephone number "03-9999-9999" of the mobile telephone B is acquired from the telephone directory storage unit 45 of the mobile telephone A (Step 512 of FIG. 18).

The call unit 47 of the mobile telephone A requests the communicator 46 to establish a session for the telephone call (Step 513 of FIG. 18).

The communicator 46 of the mobile telephone A makes a telephone call request to the communication server H (Step 514 of FIG. 18).

A telephone call coming from the mobile telephone A reaches at the mobile telephone B (Step 515 of FIG. 18).

As mentioned above, in the third exemplary embodiment, only carrying out a simple maneuver of inclining the user terminals in an arbitrary direction, respectively, to perform communication makes it possible to determine the communication policy. For this, the pseudonymous contact address of which the pseudonym level such as the anonymity, the pseudonym, and the real name is changeable can be easily delivered.

In addition, from a viewpoint of the telecommunications carriers, an increase in the users of the pseudonym communication system is expected and customers and markets are enlarged owing to the fact that the user's maneuver at the moment of delivering the contact address becomes simple.

An effect of service providers is that the user can easily utilize the temporary anonymous contact address, a opportunity that the user utilizes the service under the real name declines, and the cost of the service providers protecting private information declines.

<Fourth Exemplary Embodiment>

The fourth exemplary embodiment, similarly to the first exemplary embodiment, determines the anonymity level according to the number of times the two mobile telephones have been swung.

Herein, the so-called anonymity level is defined as a scope of the users and the communication terminals that can utilize a newly prepared contact address. For example, it is assumed that, with case of the contact address of the real-name communication, the above contact address is utilizable in any communication terminal, it is assumed that, with case of the contact address of the pseudonym communication, the contact address of the pseudonym communication is utilizable within a group to which the communication terminal of the partner to which the above contact address has been notified belongs; however, utilization by the communication terminal that does not belong to the group is restricted, and it is assumed that, with case of the contact address of the anonymity communication, a control is taken in such a manner that the contact address of the anonymity communication is utilizable only by the communication terminal of the partner to which the above contact address has been notified.

As an example of the contact address of the pseudonym communication, a control can be taken in such a manner that the contact address delivered to a specific service provider, for example, employees of restaurants is utilizable by the communication terminals of all employees belonging to the above restaurants.

Figure 19:
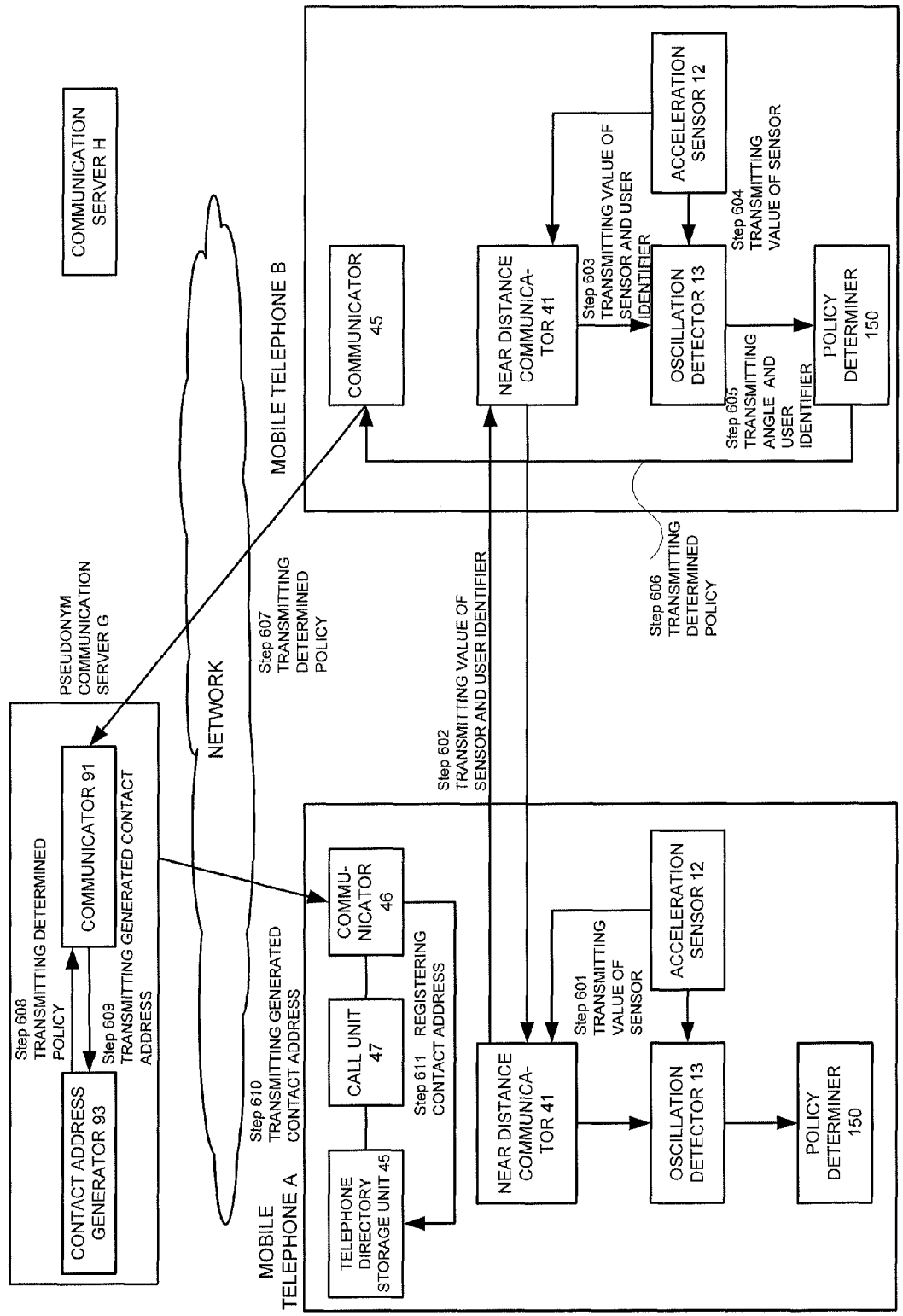
FIG. 19 is a block diagram of a fourth exemplary embodiment.

A block diagram of the fourth exemplary embodiment is shown in FIG. 19.

A difference with the block diagram of the third exemplary embodiment is that each of the mobile telephone A and the mobile telephone B is provided with a policy determiner 150 instead of the policy determiner 92 within the pseudonym communication server.

FIG. 20 is a view illustrating one example of the data table stored in the policy determiner 150 of the fourth exemplary embodiment. The data table shown in FIG. 20 includes an item of the policy related to the anonymity level corresponding to the number of times of the oscillations calculated by the oscillation detector. The data table shows that, for example, the policy is the anonymity communication when the number of times of the oscillations is one to five, the policy is the pseudonym communication when the number of times of the oscillations is 6 to 10, and the policy is the real-name communication when the number of times of the oscillations is 11 or more.

Continuously, an operation of the fourth exemplary embodiments will be explained with a point in which it differs from the operation of the third exemplary embodiment at a center using FIG. 19. Additionally, in this example, an operation of delivering the pseudonymous contact address from the mobile telephone B to the mobile telephone A will be explained.

The acceleration sensor 12 of the mobile telephone A detects the value of the sensor of the mobile telephone A, and transmits this value to the near distance communicator 41 (Step 601 of FIG. 19).

The near distance communicator 41 transmits the value received from the acceleration sensor of the mobile telephone A, and the user identifier "user001" of the owner of the mobile telephone A to the mobile telephone B (Step 602 of FIG. 19).

The near distance communicator 41 of the mobile telephone B transmits the received value of the acceleration sensor of the mobile telephone A, and the user identifier "user001" of the mobile telephone A to the oscillation detector 13 (Step 603 of FIG. 19).

The value of the acceleration sensor is transmitted from the acceleration sensor 12 of the mobile telephone B to the oscillation detector 13 (Step 604 of FIG. 19).

The oscillation detector 13 of the mobile telephone B compares the value of the acceleration censor of the mobile telephone A with that of the acceleration censor of the mobile telephone B, and calculates the number of times of the oscillation. Herein, it is assumed that the calculated number of times of the oscillation is seven. Then, the calculated number of times of the oscillation "7" and the user identifier "user001" of the mobile telephone A are transmitted from the oscillation detector 13 to the policy determiner 150 (Step 605 of FIG. 19).

The policy determiner 150 of the mobile telephone B retrieves the anonymity level "pseudonym communication" corresponding to the number of times of the oscillation "7" from the stored data table, and determines that the policy is the anonymity level "pseudonym communication". The anonymity level "pseudonym communication", the user identifier "user001", and the user identifier "user002" are transmitted from the policy determiner 150 to the communicator (Step 606 of FIG. 19).

The communicator of the mobile telephone B transmits the anonymity level "pseudonym communication", the user identifier "user001" of the mobile telephone A, and the user identifier "user002" of the mobile telephone B to the communicator of pseudonym communication server (Step 607 of FIG. 19).

The communicator 91 of the pseudonym communication server transmits the anonymity level "pseudonym communication", the user identifier "user001" of the mobile telephone A, and the user identifier "user002" of the mobile telephone B to the contact address generator (Step 608 of FIG. 19).

The contact address generator 93 of the pseudonym communication server generates the contact address based on the received anonymity level "pseudonym communication". The contact address generator transmits the generated contact address to the communicator (Step 609 of FIG. 19).

The communicator 91 within the pseudonym communication server transmits the generated contact address to communicator of the mobile telephone A (Step 610 of FIG. 19).

The communicator 46 of the mobile telephone A transmits the received contact address to the telephone directory storage unit, and the received contact address is stored in the telephone directory storage unit (Step 611 of FIG. 19).

Additionally, the situation is also similar with an operation of delivering the pseudonymous contact address to the mobile telephone B. Further, with an order of the operation of delivering the pseudonymous contact address to the mobile telephone A and delivering the pseudonymous contact address to the mobile telephone B, it does not matter which operation is firstly performed, or both operations may be performed simultaneously.

As mentioned above, in the fourth exemplary embodiment, only swinging the user terminals together makes it possible to determine the communication policy. For this, the pseudonymous contact address of which the pseudonym level such as the anonymity, the pseudonym, and the real name is changeable can be easily delivered.

In addition, from a viewpoint of the telecommunications carriers, an increase in the users of the pseudonym communication system is expected and customers and markets are enlarged owing to the fact that the user's maneuver at the moment of delivering the contact address becomes simple.

An effect of the service providers is that the user can easily utilize the temporary anonymous contact address, a opportunity that the user utilizes the service under the real name declines, and the cost of the service providers for protecting private information declines.

<Fifth Exemplary Embodiment>

A constitution example of the fifth exemplary embodiment will be explained.

Figure 21:
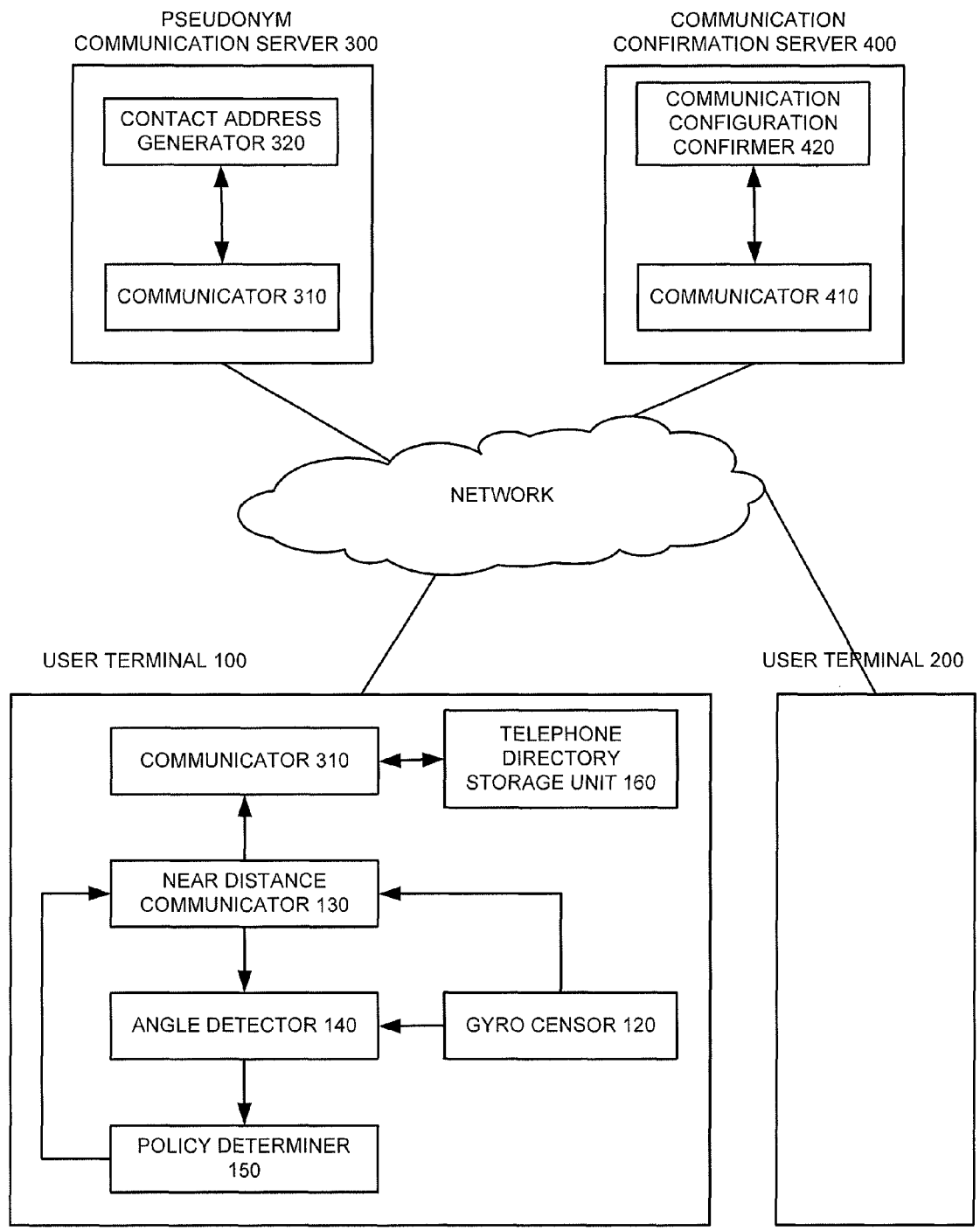
FIG. 21 is a block diagram illustrating a constitution example of a fifth exemplary embodiment.

FIG. 21 is a block diagram illustrating a constitution example of the fifth exemplary embodiment.

As shown in FIG. 21, a user terminal 100 such as the mobile telephone and a PDA that the user joining the telecommunications carrier owns, a user terminal 200, a pseudonym communication server 300 for performing communication having the policy reflected therein, and a communication confirmation server 400 that the telecommunications carrier owns are connected via the network. Additionally, the so-called telecommunications carrier is a company that provides electric communication services of a fixed telephone, a mobile telephone, and the like.

The user terminal 100 is provided with a communicator 110 for performing communication via the network, an acceleration sensor 120 for acquiring the acceleration and the rotational angle of the user terminal, a near distance communicator 130 for performing communication with the user terminals existing closely hereto without going through the network, an angle detector 140 for obtaining an angle between the user terminal 100 and the user terminal 200 of the communication partner from the value of the acceleration sensor within the user terminal 100 and the value of the acceleration sensor of the communication partner acquired from the near distance communicator 130, a policy determiner 150 for storing a correspondence table between the angle and the pseudonym level (anonymity/pseudonym/real name), and determining the communication policy according to the angle, and a telephone directory for storing contact addresses and names of the contact addresses.

Figure 22:
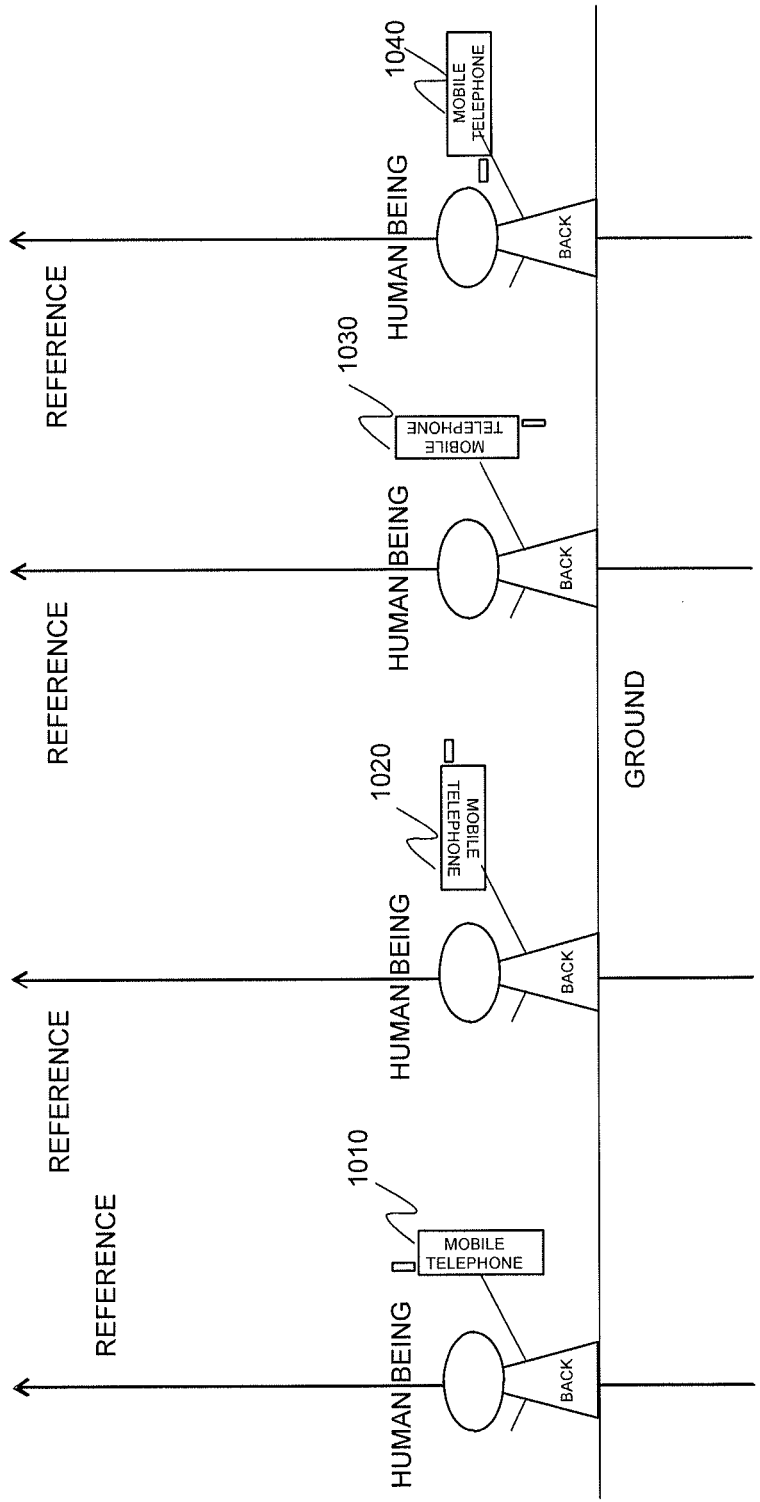
FIG. 22 is a view expressing an inclination of a user terminal in the fifth exemplary embodiment.

Additionally, the value to be detected by the acceleration sensor expresses an inclination of the user terminal. It is assumed that the inclination is 90 degree when the terminal is inclined from the left shoulder to the right shoulder, the inclination is 180 degree when the terminal is inclined from the head toward the lower direction, and the inclination is 270 degree when the terminal is inclined from the right shoulder to the left shoulder with the axis that goes toward the vertical direction from the ground assumed to be a reference. FIG. 22 is a view expressing an inclination of the user terminal, and the inclinations of 1010, 1020, 1030, and 1040 are zero degree, 90 degree, 180 degree, and 270 degree, respectively.

The angle detector 140 may exist inside the user terminal in some cases, or may exist within the server via the network in some cases.

FIG. 23 is a view illustrating one example of the correspondence table stored in the policy determiner 150, and in the above correspondence table including a detection angle detected by the angle detector 140 and an item of the communication policy corresponding to the above angle, the communication policies are listed for each angle. For example, the correspondence table shows that 1510 performs the real-name communication when the angle is 180 degree.

The so-called real-name communication is to perform communication under the real name. The so-called real name is a personally identifiable number acquired by presenting a real name, an address of its own home, its place of employment, and the like, for example, the telephone number of its own home and the mobile telephone number in a case of the telephone number.

The so-called pseudonym communication is to perform communication with the partner utilizing the contact address other than the real name previously generated, which is utilized by the communication partner. For example, the above contact address is a mail address etc. acquired free of charge, which does not include personally-identifiable information, is easily acquirable without presenting a real name, an address of its own home, and the like, and is easily cancelable.

The so-called anonymity communication is to perform communication with the partner using the personally-unidentifiable contact address. A different contact address is generated when communication is performed with a different communication partner.

Additionally, in the communication policy of the correspondence table in the policy determiner 150, not only the pseudonym level, but also the term of validity of the pseudonymous contact address, a condition of invalidity/validity, the number of times the pseudonymous contact address can be used, and the like may be written. Further, the user may freely configure the term of validity/the valid number of times of the usage of the contact address, and the like in addition to the angle and the communication policy. Further, the correspondence table may be managed not by the policy determiner within the user terminal but over the network.

For example, FIG. 24 is a view illustrating an example of listing the by-identifier number of times the user identifier can reach beside the angle and the pseudonym level. It is shown that the number of times the user identifier can reach at the moment that 1511 performs the real-name communication when the angle is 180 degree is unlimited. Further, it is shown that the number of times the user identifier can reach at the moment that 1512 performs the pseudonym communication when the angle is 90 degree is 10. Further, it is shown that the number of times the user identifier can reach at the moment that 1513 performs the anonymity communication when the angle is 0 degree is 5.

It is assumed that the user terminal 200 is constituted similarly to the user terminal 100.

The pseudonym communication server 300 is provided with a communicator 310 for performing communication via the network, and a contact address generator 320 for generating the contact address according to the anonymity level.

The communication confirmation server 400 is provided with a communicator 410 for performing communication via the network, and a communication configuration confirmer 420 for confirming that the communication from the both users has been received based on the data received by the communicator 410.

Additionally, the user identifier is a value for identifying, by the communication company, the user or the user terminal. For example, in a case of the mobile telephone, the telephone number etc. falls under this category.

Additionally, it is assumed that each user owns one user terminal, the user A is assigned the user identifier "user 001" by the telecommunications carrier and maintains the user terminal 100. Likewise, it is assumed that the user B is assigned the user identifier "user 002" and maintains the user terminal 200.

Next, an operational example of the fifth exemplary embodiment will be explained.

Figure 25:
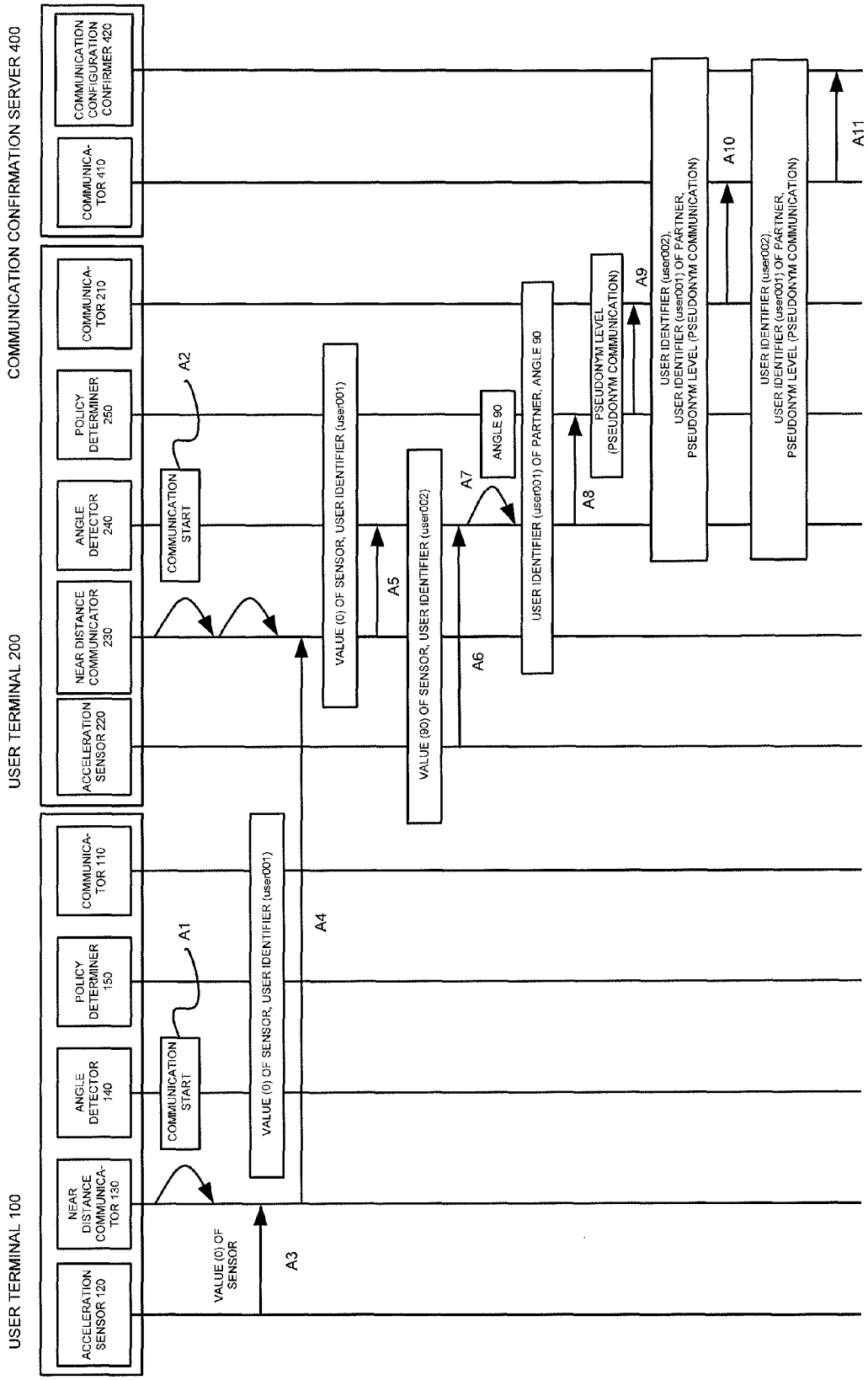
FIG. 25 is a view for explaining an operation of the fifth exemplary embodiment.
Figure 26:
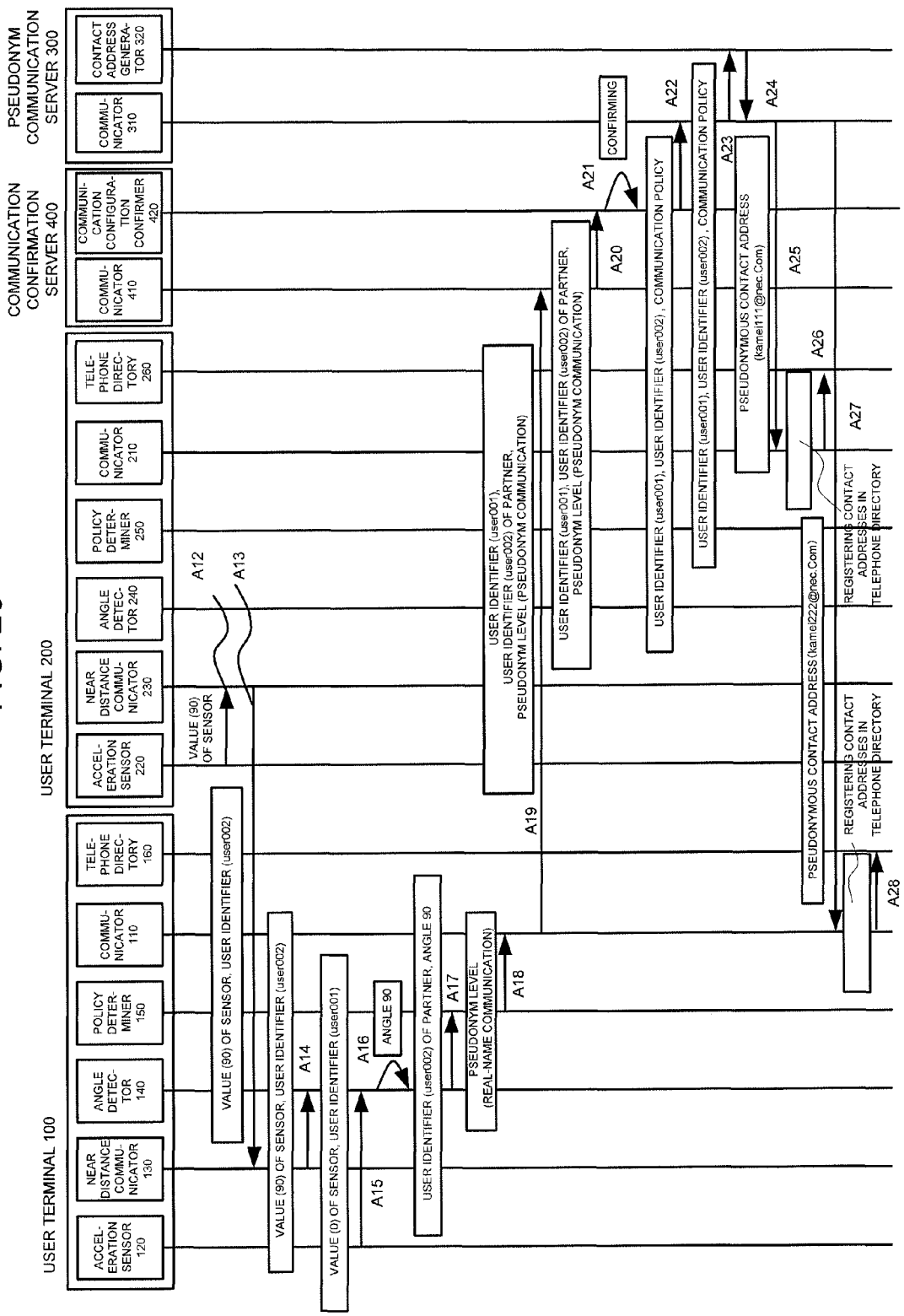
FIG. 26 is a view for explaining an operation of the fifth exemplary embodiment.

Each of FIG. 25 and FIG. 26 is a sequence diagram illustrating an example of an operation of the fifth exemplary embodiment.

The user A and the user B give a signal and carry out a maneuver of the user terminal, and the near distance communicator 130 of the user terminal 100 and a near distance communicator 230 of the user terminal 200 start the communication with each other (A1 and A2 of FIG. 25). Additionally, as a trigger for starting the near distance communication, the fact that the value of the acceleration sensor has exceeded a configured threshold may be used. And, the user terminal 100 and the user terminal 200 are overlapped each other at an arbitrary inclination. In the following explanation, with the axis that goes in a vertical direction from a ground defined as a reference, the case in which the inclination of the user terminal 100 is zero degree, and the inclination of the user terminal 200 is 90 degree with the user terminal 200 inclined from the left shoulder to the right shoulder will be explained.

The near distance communicator 130 acquires the value "zero degree" of the acceleration sensor, being the inclination of the user terminal, from the acceleration sensor 120 (A3 of FIG. 25). The near distance communicator 130 having received the value "zero degree" of the acceleration sensor transmits the value "zero degree" of the acceleration sensor and the user identifier "user001" to the near distance communicator 230 within the user terminal 200 (A4 of FIG. 25).

The near distance communicator 230 within the user terminal 200 having received the data "zero degree" of the acceleration sensor 120 and the user identifier "user001" transfers the data to an angle detector 240 (A5 of FIG. 25).

Further, the near distance communicator 230 transmits the value "90 degree" acquired by the acceleration sensor 220 of the user terminal 200 and the user identifier "user002" to the angle detector 240 (A6 of FIG. 25).

The angle detector 240 having received the acceleration "zero degree" and the user identifier "user001" of the user terminal 100, and the acceleration "90 degree" and the user identifier "user002" of the user terminal 200 calculates the angle that the user terminal 100 and the user terminal 200 form as |the value "zero degree" of the acceleration sensor of the user terminal 100—the value "90 degree" of the acceleration sensor of the user terminal 200|=90 degree from the values of the acceleration sensors (A7 of FIG. 25).

And, the angle detector 240 transmits the calculated value "90 degree" and the user identifier "user001" of the user terminal 100 to a policy determiner 250 (A8 of FIG. 25).

The policy determiner 250 having received the angle "90 degree" determines the communication policy corresponding to the angle to be "the pseudonym communication" from the correspondence table of FIG. 23, 1520 and transmits the determined communication policy to a communicator 210 (A9 of FIG. 25).

The communicator 210 having received the communication policy "pseudonym communication" transmits the user identifier "user002" of the user terminal 200, the user identifier "user001" of the communication partner, and the communication policy "pseudonym communication" to the communicator 410 within the communication confirmation server 400 (A10 of FIG. 25).

The communicator 410 having received the communication policy "pseudonym communication", the user identifier "user001" of the side in which the policy is configured, and the user identifier "user002" of the communication partner transmits to the communication configuration confirmer 420 the communication policy "pseudonym communication" that is configured (A11 of FIG. 25).

After the Steps A1 and A2, the value "90 degree" acquired by the acceleration sensor 220 within the user terminal 200 is notified to the near distance communicator 230 (A12 of FIG. 26).

The near distance communicator 230 having received the value "90 degree" of the acceleration sensor transmits the value "90 degree" of the acceleration sensor together with the user identifier "user002" to the near distance communicator 130 within the user terminal 100 (A13 of FIG. 26).

The near distance communicator 130 within the user terminal 100 having received the data "90 degree" of the acceleration sensor 220 and the user identifier "user002" transfers the data to the angle detector 140 (A14 of FIG. 26).

Further, the acceleration sensor 120 of the user terminal 100 transmits the acquired value "zero degree" and the user identifier "user001" to the angle detector 140 (A15 of FIG. 26).

The angle detector 140 having received the acceleration "zero degree" and the user identifier "user001" of the user terminal 100 as well as the acceleration "90 degree" and the user identifier "user002" of the user terminal 200 calculates the angle that the mobile terminal A and the mobile terminal B form as |the value "zero degree" of the acceleration sensor of the user terminal 100—the value "90 degree" of the acceleration sensor of the user terminal 200|=90 degree from the values of the acceleration sensors (A16 of FIG. 26).

And, the angle detector 140 transmits the calculated value "90 degree" and the user identifier "user002" to the policy determiner 150 (A17 of FIG. 26).

The policy determiner 150 having received the angle "90 degree" determines the communication policy corresponding to the angle to be "the pseudonym communication" from the correspondence table of FIG. 23, 1520, and transmits the determined communication policy "pseudonym communication" to the communicator 110 (A18 of FIG. 26).

The communicator 110 having received the communication policy "pseudonym communication" transmits the user identifier "user001" of the mobile terminal A, the user identifier "user002" of the communication partner, and the communication policy "pseudonym communication" to the communicator 410 within the communication confirmation server 400 (A19 of FIG. 26).

The communicator 410 having received the communication policy "pseudonym communication", the user identifier "user001" of the side in which the policy is configured, and the user identifier "user002" of the communication partner transmits to the communication configuration confirmer 420 the communication policy "pseudonym communication" that is configured (A20 of FIG. 26).

Additionally, the Steps A3 to A11 and the Steps A12 to A20 may be performed simultaneously, the Steps A3 to A11 and the Steps A12 to A20 may be performed in an opposite order, and only the Steps A1 to A11 or only the Steps A1 to A2 and A12 to A20 may be performed.

The communication configuration confirmer 420 confirms that the communication policies have been received from both of the user identifier "user001" and the user identifier "user002" (A21 of FIG. 26).

The communication configuration confirmer 420 having confirmed the reception of the communication policy transmits the user identifiers "user001" and "user002", and the determined communication policy "pseudonym communication" to the contact address generator 320 of the pseudonym communication server (A22 and A23 of FIG. 26).

The contact address generator 320 having received the user identifiers "user001" and "user002", and the communication policy "pseudonym communication" generates a pseudonymous contact address "kamei111@nec.com" of the user identifier "user001" and a pseudonymous contact address "kamei222@nec.com" of the user identifier "user002". Additionally, with regard to the pseudonymous contact address to be generated, both of the user identifier "user001" and the user identifier "user002" may generate one contact address that can originate/reach in a line with the policy such as the indicated valid number of times in addition to the pseudonym level.

The contact address generator 320 notifies the generated pseudonymous contact address "kamei111@nec.com" to the user identifier "user002" via the communicator 310. And, the communicator 210 of the user terminal 200 preserves the received contact address "kamei111@nec.com" into a telephone directory 260 of the user terminal 200 (A24, A25, and A26 of FIG. 26).

Likewise, the contact address generator 320 notifies the generated pseudonymous contact address "kamei222@nec.com" to the user identifier "user001" via the communicator 310. And, the communicator 110 of the user terminal 100 preserves the received contact address "kamei222@nec.com" into a telephone directory 160 of the user terminal 100 (A24, A27, and A28 of FIG. 26).

An order of the notification of the pseudonymous contact addresses does not matter. Further, the notified contact addresses may be registered or may not be registered in the telephone directory.

The user terminal 100 with the user identifier "user001" makes a contact with the user identifier "user002" utilizing the pseudonymous contact address "kamei222@nec.com".

As one example of the method of making a contact, when the user terminal 100 with the user identifier "user001" makes a mail to the user identifier "user002", the user terminal 100 transmits the mail with the user identifier "user001" assumed to be "TO:kamei222@nec.com, FM:user001". The pseudonym communication server 400 converts "kamei222@nec.com" into "user002", and "user001" into "kamei111@nec.com", respectively, and transmits the mail. And, as another example, the case in which the user terminal 200 with the user identifier "user002" receives the mail saying "TO:user002, FM:kamei111@nec.com", and the like are listed.

As mentioned above, in the fifth exemplary embodiment, only carrying out a simple maneuver of inclining the user terminals in an arbitrary direction, respectively, to perform communication makes it possible to determine the communication policy. For this, the pseudonymous contact address of which the pseudonym level such as the anonymity, the pseudonym, and the real name is changeable can be easily delivered.

In addition, from a viewpoint of the telecommunications carriers, an increase in the users of the pseudonym communication system is expected and customers and markets are enlarged owing to the fact that the user's maneuver at the moment of delivering the contact address becomes simple.

An effect of the service providers is that the user can easily utilize the temporary anonymous contact address, a opportunity that the user utilizes the service under the real name declines, and the cost of the service providers for protecting private information can be curtailed.

<Sixth Exemplary Embodiment>

The sixth exemplary embodiment will be explained.

In the sixth exemplary embodiment, an example of generating the contact addresses corresponding to all members of the group selected by the user will be explained. For example, conventionally, in a case in which a restaurant is crowded when the user A comes to the restaurant, an employee of the restaurant likes to make a contact with the user A as soon as a seat is available, and inquires the mobile telephone number etc. of the user A in many cases. However, as a rule, the user A does not like to tell the mobile telephone number etc, which is equivalent to private information, to others in a easy manner even though its face becomes known. Thereupon, in the sixth exemplary embodiment, delivering the anonymous contact address by using the terminal of the user A, the terminals of the employees of the restaurant, and the private terminal of the restaurant allows the user A to perform the anonymity communication with the employees of the restaurant. Specifically, when the contact address is generated between the user A and the user B, being one of the employees of the restaurant, the contact address is enabled between the user A and all employees of the restaurant. As a result, all employees of the restaurant can be involved in a seat guidance affair when the seats are empty.

Figure 27:
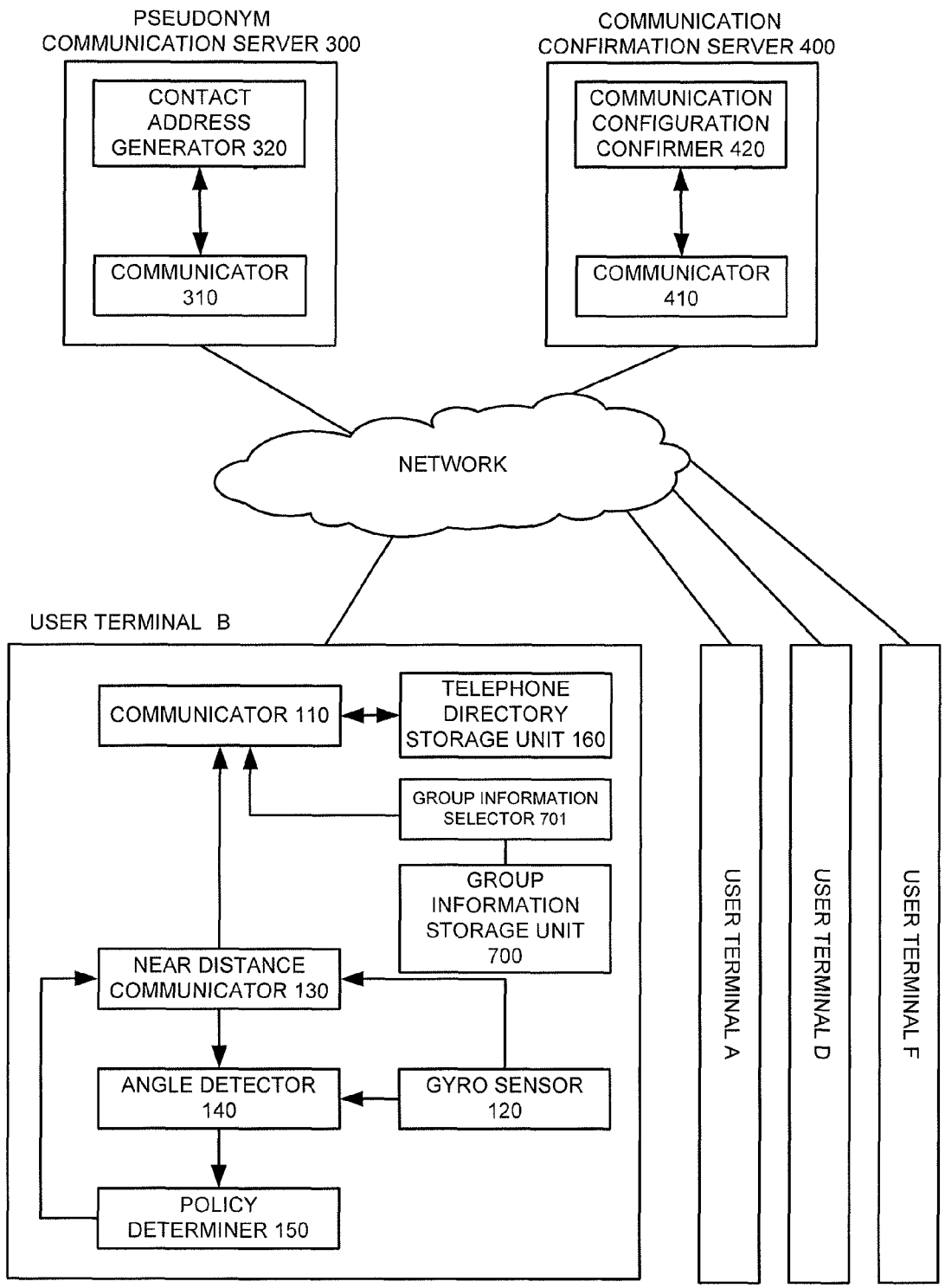
FIG. 27 is a constitution view illustrating a sixth exemplary embodiment.

FIG. 27 is a constitution view illustrating the sixth exemplary embodiment.

A difference with the fifth exemplary embodiment will be explained with regard to a constitution view of the sixth exemplary embodiment.

In a constitution view of the sixth exemplary embodiment, each user terminal is provided with a group information storage unit 700 and a group information selector 701.

The group information selector 701 selects whether the communication address issued by the pseudonym communication server 300 is connected to an individual or a group, and determines the group to which the communication address is connected when the group is selected.

FIG. 28 is a view illustrating one example of the storage content of the group information storage unit 700 of the user terminal B with the user identifier "user002" that user B owns. In the group information storage unit 700, similarly to FIG. 28, the group name is affixed for each group number, and the user identifiers of the users belonging to the above group are listed. 5210 shows that the user identifiers "user002", user004", and "user006" belong to the group name "restaurant employee", being the group number 1.

Additionally, the content of the group information storage unit 700 may be registered into the user terminal as one part of the telephone directory in some cases, or may be registered as one part of the network telephone directory in some cases.

Figure 29:
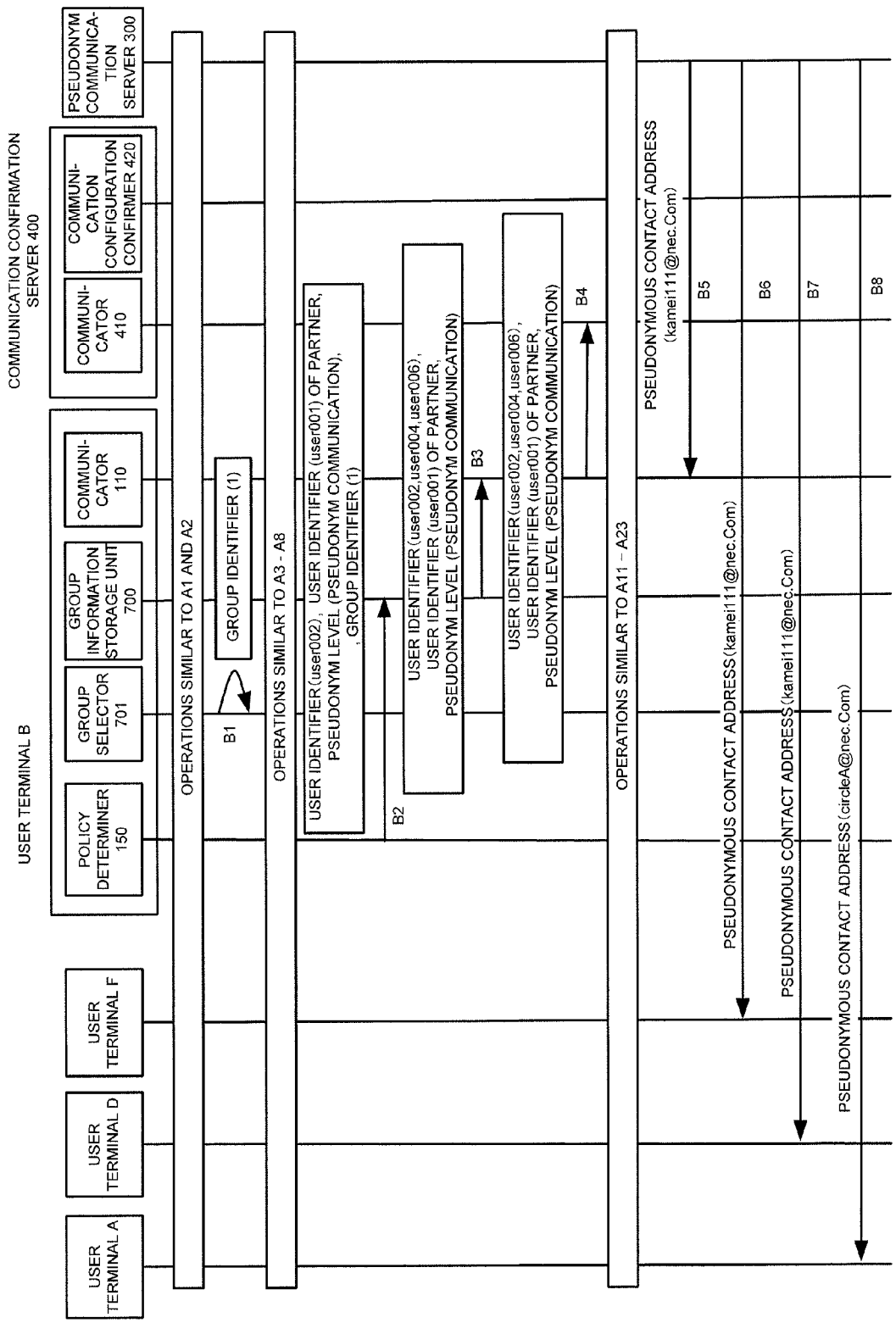
FIG. 29 is a view for explaining an operation of a sixth exemplary embodiment.

Next, an operational example of the sixth exemplary embodiment will be explained. FIG. 29 is a sequence diagram illustrating an example of an operation of the six exemplary embodiment.

In the following explanation, it is assumed that the user identifier "user001" is the user A, the user identifier "user002" is the user B, the user identifier "user004" is the user D, and the user identifier "user006" is the user F. Further, it is assumed that the user A owns a user terminal A, the user B owns a user terminal B, the user D owns a user terminal D, and the user F owns a user terminal F. And, the case will be explained that the contact address is generated between the user A and the user B, being one employee of the restaurant when the user A comes to the restaurant, and the contact address is enabled between the user A and each of the user B, the user D and the user F, being employees of the restaurant.

At first, the operations of A1 and A2 in the above-described fifth exemplary embodiment are performed between the user terminal A and the user terminal B. Herein, it is assumed that the angle that the user terminal A and the user terminal B form is 90 degree.

The user B, being an owner of the user terminal B, inputs a group identifier "1" by the group information selector 701 (selects a group name "restaurant employee") (B1 of FIG. 29).

The operations of A3 to A8 in the fifth exemplary embodiment are performed between the user terminal A and the user terminal B.

The policy determiner 250 having received the angle "90 degree" from the angle detector 140 of the user terminal B determines the communication policy corresponding to the angle to be "the pseudonym communication" from the correspondence table of FIG. 24, and transmits the determined communication policy and the group information identifier "1" to the group information selector 701 (B2 of FIG. 29).

The group information selector 701 of the user terminal B 200 transmits the user identifier "user002", the user identifier "user001" of the communication partner, the communication policy "pseudonym communication", and the group identifier "1" to the group information storage unit 700 (B3 of FIG. 29).

The group information storage unit 700 having received the group identifier "1" transmits the user identifiers "user002", "user004", and "user006" corresponding to the group identifier "1", the user identifier "user001" of the communication partner, and the communication policy "pseudonym communication" to the communicator 110 (B4 of FIG. 29).

Hereinafter, operations of A11 to A23 are similar to those of the fifth exemplary embodiment.

The contact address generator 320 having received the user identifiers "user001", "user002", "user004", and "user006" and the communication policy "pseudonym communication" generates a pseudonymous contact address "kamei111@nec.com" corresponding to the user identifier "user001" and a pseudonymous contact address "circleA@nec.com" corresponding to the user identifiers "user002", "user004", and "user006".

The pseudonymous contact address "circleA@nec.com" corresponding to the user identifiers "user002", "user004", and "user006" is, for example, a mailing list etc.

And, the pseudonym communication server 300 notifies the generated pseudonymous contact address "kamei111@nec.com" to the user terminal B with the user identifier "user002" (B5 of FIG. 29).

Further, the pseudonym communication server 300 notifies the generated pseudonymous contact address "kamei111@nec.com" to the user terminal F with the user identifier "user006" (B6 of FIG. 29).

Further, the pseudonym communication server 300 notifies the generated pseudonymous contact address "kamei111@nec.com" to the user terminal D with the user identifier "user004" (B7 of FIG. 29).

Further, the pseudonym communication server 300 notifies the generated pseudonymous contact address "circleA@nec.com" to the user terminal A with the user identifier "user001" (B8 of FIG. 29).

Additionally, an order of the notification of the pseudonymous contact addresses does not matter.

When the user A with the user identifier "user001" having received the pseudonymous contact address transmits a mail using the pseudonymous contact address "circleA@nec.com", all members of the user terminal B with the user identifier "user002", the user terminal D with the user identifier "user004", and "the user terminal F with the user identifier "user006" receive the mail coming from the user identifier "user001".

Additionally, the policy determined by the policy determiner 150 is applied when the user of the group selected by the user identifier "user002" makes a contact with the user terminal A with the user identifier "user001". For example, in a case of making a contact from the user identifier "user004" to the user identifier "user001" using the pseudonymous contact address "kamei111@nec.com", the user terminal D with the user identifier "user004" performs communication with the user terminal A with the user identifier "user001" under the pseudonym.

As mentioned above, in the sixth exemplary embodiment, there is no necessity for conveying the addresses etc. including the real names of the users and the like to the service provider when the user waits for the empty seats of restaurant, karaoke, and the like, which contributes to an increase in the utilization of the users who hesitate to convey these items of the information and have not received the service so far.

<Seventh Exemplary Embodiment>

The seventh exemplary embodiment will be explained.

The seventh exemplary embodiment automatically judges whether or not the content of an individual schedule and the group caused to correspond to each other. For example, an individual activates as a member of an organization in an active time zone such as a circle and a part time job. Thus, when "circle" is described in a schedule note of the user, it is self-evident that the above user is being involved in the circle activity. Thereupon, an example in which making a constitution in such a manner that the address of the policy fitted to the group listed in the schedule note is automatically selected by linking selection of the group and a scheduler to each other makes it possible to deliver the address of the policy fitted to the group listed in the schedule note without taking labor and time will be explained.

Figure 30:
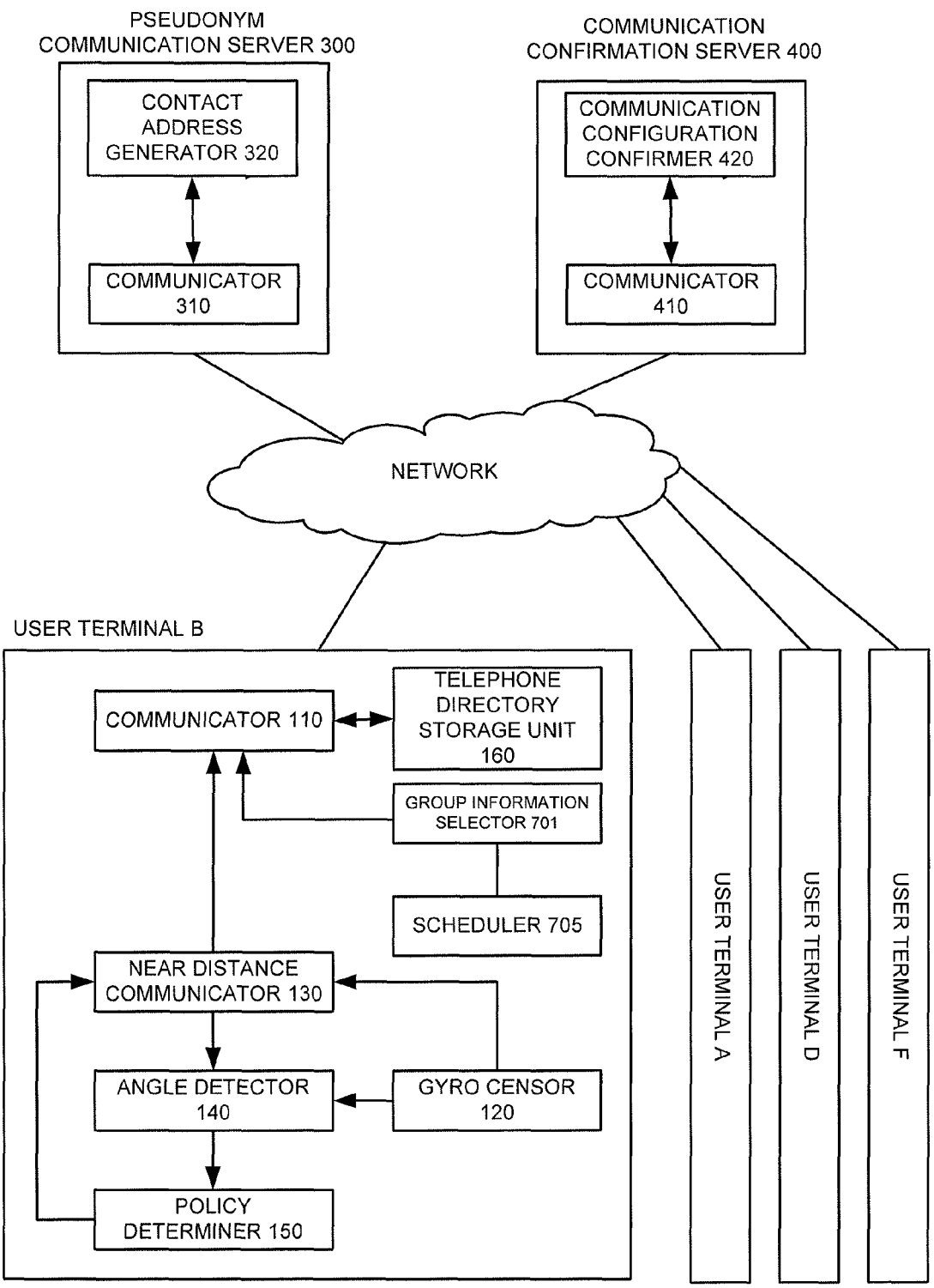
FIG. 30 is a constitution view illustrating a seventh exemplary embodiment.

FIG. 30 is a constitution view illustrating the seventh exemplary embodiment.

A difference with the sixth exemplary embodiment will be explained with regard to a constitution view of the seventh exemplary embodiment.

In a constitution view of the seventh exemplary embodiment, a scheduler 705 is provided.

The scheduler 705 has the schedules registered for each user identifier therein, like 5110 of FIG. 31. 5110 is one example of the schedule. In one example of the scheduler 705, it is shown that the user B with the user identifier "user002" is involved in a recruiting activity of a circle from 13:00 to 15:00, on Apr. 12, 2009. Further, it is shown that the portion circled in parenthesis is the group identifier. It is shown that a schedule example of 5110 is the group identifier "circle".

FIG. 32 is a view illustrating one example of the storage content of the group information storage unit 700 of the user terminal B with the user identifier "user002" that the user B owns in the seventh exemplary embodiment. In an example of FIG. 32, the group name is affixed to each group number and the user identifiers of the users belonging to the above group are listed in the group information storage unit 700. 5220 of FIG. 32 shows that the user identifiers "user002", user004", and "user006" belong to the group name "circle", being the group number 1.

Next, an operational example of the seven exemplary embodiment will be explained. FIG. 33 is a sequence diagram illustrating an example of an operation of the seventh exemplary embodiment.

In the following explanation, it is assumed that the user identifier "user001" is the user A, the user identifier "user002" is the user B, the user identifier "user004" is the user D, and the user identifier "user006" is the user F. Further, it is assumed that the user A owns a user terminal A, the user B owns a user terminal B, the user D owns a user terminal D, and the user F owns a user terminal F. And, the case will be explained that the contact address is generated between the user A and the user B, being one of members of the circle, when the user B persuades the user A for the recruiting activity, and the contact address is enabled between the user A, and each of the user B, the user D and the user F, being the member of the circle.

At first, the operations of A1 and A2 in the above-described fifth exemplary embodiment are performed between the user terminal A and the user terminal B. Herein, it is assumed that the angle that the user terminal A and the user terminal B form is 90 degree. Operations of A1 to A8 that are operations after them are similar to those of the fifth exemplary embodiment.

The policy determiner 150 having received the angle "90 degree" determines the communication policy corresponding to the angle to be "the pseudonym communication" from the correspondence table of FIG. 24, and transmits the determined communication policy "pseudonym communication" and the user identifier "user002" to the scheduler (C1 of FIG. 33).

The scheduler 705 confirms existence or not and the content of the schedule corresponding to the time "Apr. 12, 2009" when the user identifier has been received, according to the schedule with the user identifier "user002" (C2 of FIG. 33).

"11:00.00 to 15:00 "circle" recruiting activity" is stored in the schedule of the scheduler 705, as shown in FIG. 31, whereby the group identifier "circle" is transmitted to the group information unit (C3 of FIG. 33). Additionally, the time may be acquired from a network clock in some cases, or data of a radio wave clock may be acquired from a radio wave in some cases.

The group information storage unit 700 having received the group identifier "circle" transmits the user identifiers "user002", "user004", and "user006" corresponding to the group identifier "circle" to the communicator 110 according to the correspondence table of FIG. 32 (C4 of FIG. 33).

Hereinafter, operations are similar to that of the above-described fifth exemplary embodiment and sixth exemplary embodiment.

As described above, in the seventh exemplary embodiment, linking the selection of the group and the scheduler to each other makes it possible to deliver the pseudonymous address fitted to the selected group without causing the user to take labor and time.

Further, while each unit was constituted with hardware in the above-described exemplary embodiments, it may be constituted with a program that causes CPU etc. to execute the similar operations.

Above, although the present invention has been particularly described with reference to the preferred embodiments, it should be readily apparent to those of ordinary skill in the art that the present invention is not always limited to the above-mentioned embodiments, and changes and modifications in the form and details may be made without departing from the spirit and scope of the invention.

Further, the content of the above-mentioned exemplary embodiments can be expressed as follows.

(Supplementary note 1) A communication system comprising at least two communication terminals or more, comprising:

attitude status detecting means that detects an attitude status of the communication terminal;

relationship calculating means that calculates a relationship of the attitude status between said communication terminals based on the attitude status of each communication terminal detected by said attitude status detecting means; and communication policy determining means that determines a communication policy to be applied between said communication terminals based on the relationship of the attitude status between said communication terminals.

(Supplementary note 2) The communication system according to Supplementary note 1:

wherein said attitude status detecting means detects an inclination with a predetermined attitude of said communication terminal assumed to be a reference; and wherein said relationship calculating means calculates an angle formed by the communication terminals, based on the inclination of each communication terminal detected by said attitude status detecting means.

(Supplementary note 3) The communication system according to Supplementary note 1:

wherein said attitude status detecting means detects a change in an acceleration of the communication terminal; and wherein said relationship calculating means calculates a number of synchronizations of an operation between said communication terminals, based on the change in the acceleration of each communication terminal detected by said attitude status detecting means.

(Supplementary note 4) The communication system according to one of Supplementary note 1 to Supplementary note 3, comprising information determining means that determines or generates information to be transmitted to at least one communication terminal or more, out of said communication terminals, based on said communication policy.

(Supplementary note 5). The communication system according to one of Supplementary note 1 to Supplementary note 4, wherein said communication policy is at least one of a disclosure level, an anonymity level, a term of validity, and a disclosure scope of information that are transmitted to at least one communication terminal or more, out of said communication terminals, or a combination thereof.

(Supplementary note 6) The communication system according to one of Supplementary note 1 to Supplementary note 5, wherein the information to be transmitted to said communication terminal is at least one of a mail address, a telephone number, and predetermined private information.

(Supplementary note 7) The communication system according to one of Supplementary note 1 to Supplementary note 6, wherein said communication terminal comprises said attitude status detecting means, said relationship calculating means that calculates the relationship of the attitude status between said communication terminals, said communication policy determining means, and said information determining means.

(Supplementary note 8) The communication system according to one of Supplementary note 1 to Supplementary note 6, wherein said communication terminal comprises said attitude status detecting means, said relationship calculating means that calculates the relationship of the attitude status between said communication terminals, and said communication policy determining means, wherein a server for performing communication with said each communication terminal comprises said information determining means.

(Supplementary note 9) A communication system comprising at least one first communication terminal or more, at least one second communication terminal or more, and a server:
  wherein said first communication terminal comprises:
    attitude status detecting means that detects an attitude status of its own first communication terminal; and
    transmitting means that transmits said detected attitude status and an identifier of its own first communication terminal to said second communication terminal;
  wherein said second communication terminal comprises:
    attitude status detecting means that detects the attitude status of its own second communication terminal;
    relationship calculating means that calculates a relationship of the attitude status between said first communication terminal and said second communication terminal based on the attitude status of said first communication terminal and the attitude status of said second communication terminal;
    communication policy determining means that determines a communication policy to be applied between said first communication terminal and said second communication terminal based on said relationship of the attitude status; and
    transmitting means that transmits said communication policy, and identifiers of said first communication terminal and said second communication terminal to said server; and
  wherein said server comprises communicating means that, based on the identifiers of said first communication terminal and said second communication terminal, and said communication policy, configures communication based on said communication policy for the communication between said first communication terminal and said second communication terminal.

(Supplementary note 10) A communication system according to Supplementary note 9:
  wherein said first communication terminal comprises:
    relationship calculating means that calculates the relationship of the attitude status between said first communication terminal and said second communication terminal based on the attitude status of said first communication terminal and the attitude status of said second communication terminal;
    communication policy determining means that determines the communication policy to be applied between said first communication terminal and said second communication terminal based on said relationship of the attitude status; and
    transmitting means that transmits said communication policy and the identifier of said first communication terminal to said second communication terminal; and
  wherein the transmitting means of the second communication terminal confirms whether the communication policy coming from said first communication terminal coincides with the communication policy coming from said second communication terminal, and transmits said communication policy, and the identifiers of said first communication terminal and said second communication terminal to said server when the communication policies coincide with each other.

(Supplementary note 11) The communication system according to Supplementary note 9 or Supplementary note 10:
  wherein said second communication terminal comprises a group table in which at least an identifier of one communication terminal or more and a group identifier including said identifier of the communication terminal have been caused to correspond to each other, and selecting means that selects the group identifier to which said communication policy is applied from said group table;
  wherein the transmitting means of said second communication terminal transmits to said server said communication policy, and the identifiers of said first communication terminal, said second communication terminal and the communication terminal to be included in a group having said selected group identifier; and
  wherein the communicating means of said server that, based on said communication policy, and the identifiers of said first communication terminal, said second communication terminal and said selected communication terminal, configures communication based on said communication policy for the communication among said first communication terminal, said second communication terminal and said communication terminal of the selected group.

(Supplementary note 12) The communication system according to Supplementary note 11:
  wherein said second communication terminal comprises schedule storing means having a date and the identifier of said group corresponding to the date stored therein; and
  wherein said selecting means retrieves the group identifier corresponding to a detection date of said attitude status detecting means from said schedule storing means, and selects the group having this group identifier as a group to which said communication policy is applied.

(Supplementary note 13) The communication system according to one of Supplementary note 9 to Supplementary note 12:
  wherein said attitude status detecting means detects an inclination with a predetermined attitude of said communication terminal assumed to be a reference; and
  wherein said relationship calculating means calculates an angle formed by the communication terminals, based on the inclination of each communication terminal detected by said attitude status detecting means.

(Supplementary note 14) The communication system according to one of Supplementary note 9 to Supplementary note 12:

wherein said attitude status detecting means detects a change in an acceleration of the communication terminal; and wherein said relationship calculating means calculates a number of synchronizations of an operation between said communication terminals, based on the change in the acceleration of each communication terminal detected by said attitude status detecting means.

(Supplementary note 15) The communication system according to one of Supplementary note 9 to Supplementary note 14, wherein said communication policy is at least one of a disclosure level, an anonymity level, a term of validity, and a disclosure scope of information that are transmitted to at least one communication terminal or more, out of said communication terminals, or a combination thereof.

(Supplementary note 16) A communication terminal in a communication system comprising communication policy determining means that determines, based on a relationship of an attitude status between the communication terminals, a communication policy to be applied between said communication terminals, comprising:

attitude status detecting means that detects the attitude status of its own communication terminal;

receiving means that receives the attitude status of a communication destination communication terminal, being a communication destination, and an identifier of said communication destination communication terminal;

relationship calculating means that calculates a relationship of the attitude status between said its own communication terminal and said communication destination communication terminal based on the attitude status of said its own communication terminal and the attitude status of said communication destination communication terminal; and transmitting means that transmits said relationship of the attitude status, and the identifiers of said its own communication terminal and said communication destination communication terminal to said communication policy determining means.

(Supplementary note 17) A communication terminal in a communication system comprising communicating means that configures communication based on a predetermined policy between the communication terminals, comprising:

attitude status detecting means that detects an attitude status of its own communication terminal;

receiving means that receives the attitude status of a communication destination communication terminal, being a communication destination, and an identifier of said communication destination communication terminal;

relationship calculating means that calculates a relationship of the attitude status between said its own communication terminal and said communication destination communication terminal based on the attitude status of said its own communication terminal and the attitude status of said communication destination communication terminal;

communication policy determining means that determines a communication policy to be applied between said its own communication terminal and said communication destination communication terminal based on said relationship of the attitude status; and transmitting means that transmits said communication policy, and the identifiers of said its own communication terminal and said communication destination communication terminal to said communicating means.

(Supplementary note 18) A communication terminal, comprising:

attitude status detecting means that detects an attitude status of its own communication terminal;

receiving means that receives the attitude status of a communication destination communication terminal, being a communication destination, and an identifier of said communication destination communication terminal;

relationship calculating means that calculates a relationship of the attitude status between said its own communication terminal and said communication destination communication terminal based on the attitude status of said its own communication terminal and the attitude status of said communication destination communication terminal;

communication policy determining means that determines a communication policy to be applied between said its own communication terminal and said communication destination communication terminal based on said relationship of the attitude status; and communicating means that performs communication based on said communication policy between said its own communication terminal and said communication destination communication terminal.

(Supplementary note 19) The communication terminal according to one of Supplementary note 16 to Supplementary note 18, wherein the transmitting means confirms whether the communication policy coming from said communication destination communication terminal coincides with said determined communication policy of own communication terminal, and transmits said communication policy, and the identifiers of said own communication terminal and said communication destination communication terminal to said communicating means when the communication policies coincide with each other.

(Supplementary note 20) The communication terminal according to one of Supplementary note 16 to Supplementary note 20, wherein said communication terminal comprises a group table in which at least an identifier of one communication terminal or more and a group identifier including said identifier of the communication terminal have been caused to correspond to each other, and selecting means that selects the group identifier to which said communication policy is applied from said group table;

wherein said transmitting means transmits to said communicating means said communication policy, and the identifiers of said own communication terminal, said communication destination communication terminal and the communication terminal to be included in a group having said selected group identifier.

(Supplementary note 21) The communication terminal according to Supplementary note 20, comprises schedule storing means having a date and the identifier of said group corresponding to the date stored therein; and wherein said selecting means retrieves the group identifier corresponding to a detection date of said attitude status detecting means from said schedule storing means, and selects the group having this group identifier as a group to which said communication policy is applied.

(Supplementary note 22) The communication terminal according to one of Supplementary note 16 to Supplementary note 20:

wherein said attitude status detecting means detects an inclination with a predetermined attitude of said communication terminal assumed to be a reference; and wherein said relationship calculating means calculates an angle formed by the communication terminals, based on the inclination of each communication terminal detected by said attitude status detecting means.

(Supplementary note 23) The communication terminal according to one of Supplementary note 16 to Supplementary note 20:

wherein said attitude status detecting means detects a change in an acceleration of the communication terminal; and wherein said relationship calculating means calculates a number of synchronizations of an operation between said communication terminals, based on the change in the acceleration of each communication terminal detected by said attitude status detecting means.

(Supplementary note 24) The communication terminal according to one of Supplementary note 16 to Supplementary note 23, wherein said communication policy is at least one of a disclosure level, an anonymity level, a term of validity, and a disclosure scope of information that are transmitted to at least one communication terminal or more, out of said communication terminals, or a combination thereof.

(Supplementary note 25) A communication method in a communication system comprising at least two communication terminals or more, comprising:

detecting an attitude status of each communication terminal;

calculating a relationship of the attitude status between said communication terminals based on the attitude status of said each communication terminal; and determining information to be transmitted to at least one communication terminal or more, out of said communication terminals, based on the relationship of the attitude status between said communication terminals.

(Supplementary note 26) The communication method according to Supplementary note 25:

wherein said attitude status of each communication terminal is an inclination with a predetermined attitude of said communication terminal assumed to be a reference; and wherein said relationship of the attitude status between said communication terminals is an angle formed by the communication terminals, based on said inclination of each communication terminal.

(Supplementary note 27) The communication method according to Supplementary note 25:

wherein said attitude status of each communication terminal is a change in an acceleration of the communication terminal; and wherein said relationship of the attitude status between said communication terminals is a number of synchronizations of an operation between said communication terminals.

(Supplementary note 28) The communication method according to one of Supplementary note 25 to Supplementary note 27, wherein said information to be transmitted to said communication terminal is at least one of a mail address, a telephone number, and predetermined private information.

(Supplementary note 29) The communication method according to one of Supplementary note 25 to Supplementary note 28, determining a communication policy to be applied between said communication terminals based on the relationship of the attitude status between said communication terminals, determining information to be transmitted to at least one communication terminal or more, out of said communication terminals, based on said communication policy.

(Supplementary note 30). The communication method according to one of Supplementary note 25 to Supplementary note 29, wherein said communication policy is at least one of a disclosure level, an anonymity level, a term of validity, and a disclosure scope of information that are transmitted to at least one communication terminal or more, out of said communication terminals, or a combination thereof.

(Supplementary note 31) A program of a communication terminal in a communication system comprising communicating policy determining means that determines, based on a relationship of an attitude status between the communication terminals, a communication policy to be applied between said communication terminals, causing the communication terminal to execute:

attitude status detecting process of detecting an attitude status of its own communication terminal;

receiving process of receiving the attitude status of a communication destination communication terminal, being a communication destination, and an identifier of said communication destination communication terminal;

relationship calculating process of calculating a relationship of the attitude status between said its own communication terminal and said communication destination communication terminal based on the attitude status of said its own communication terminal and the attitude status of said communication destination communication terminal; and transmitting process of transmitting said relationship of the attitude status, and the identifiers of said its own communication terminal and said communication destination communication terminal to said communication policy determining means.

(Supplementary note 32) A program of a communication terminal in a communication system comprising communicating means that configures communication based on a predetermined policy between the communication terminals, causing the communication terminal to execute:

attitude status detecting process of detecting an attitude status of its own communication terminal;

receiving process of receiving the attitude status of a communication destination communication terminal, being a communication destination, and an identifier of said communication destination communication terminal;

relationship calculating process of calculating a relationship of the attitude status between said its own communication terminal and said communication destination communication terminal based on the attitude status of said its own communication terminal and the attitude status of said communication destination communication terminal;

communication policy determining process of determining a communication policy to be applied between said its own communication terminal and said communication destination communication terminal based on said relationship of the attitude status; and transmitting process of transmitting said communication policy, and the identifiers of said its own communication terminal and said communication destination communication terminal to said communicating means.

(Supplementary note 33) A program of a communication terminal, causing the communication terminal to execute:

attitude status detecting process of detecting an attitude status of its own communication terminal;

receiving process of receiving the attitude status of a communication destination communication terminal, being a communication destination, and an identifier of said communication destination communication terminal;

relationship calculating process of calculating a relationship of the attitude status between said its own communication terminal and said communication destination communication terminal based on the attitude status of said its own communication terminal and the attitude status of said communication destination communication terminal;

communication policy determining process of determining a communication policy to be applied between said its own communication terminal and said communication destination communication terminal based on said relationship of the attitude status; and communicating process of performing communication based on said communication policy between said its own communication terminal and said communication destination communication terminal.

This application is based upon and claims the benefit of priority from Japanese patent application No. 2010-041990, filed on Feb. 26, 2010, the disclosure of which is incorporated herein in its entirety by reference.

[Reference Signs List]

$1_1$ and $1_2$ posture status detectors
2 relationship calculator
3 communication policy determiner

The invention claimed is:

1. A communication system comprising at least two communication terminals or more, and a server, comprising:
a posture status detector that detects a posture status of each of the at least two communication terminals;
a relationship calculator that calculates a relationship between said at least two communication terminals based on the posture status of each communication terminal detected by said posture status detector; and
a communication policy determining unit that determines a communication policy to be applied between said at least two communication terminals based on the calculated relationship between said at least two communication terminals,
wherein said server configures communication between said at least two communication terminals, based on said determined communication policy.

2. The communication system according to claim 1,
wherein said posture status detector detects an inclination with a predetermined posture of said at least two communication terminals assumed to be a reference; and
wherein said relationship calculator calculates an angle formed by the at least two communication terminals, based on the inclination of each communication terminal detected by said posture status detector.

3. The communication system according to claim 1,
wherein said posture status detector detects a change in an acceleration of the communication terminal; and
wherein said relationship calculator calculates a number of synchronizations of an operation between said at least two communication terminals, based on the change in the acceleration of each communication terminal detected by said posture status detector.

4. The communication system according to claim 1, wherein said server comprises an information determining unit that determines or generates information to be transmitted to at least one or more of said at least two communication terminals, based on said communication policy.

5. The communication system according to claim 1, wherein said communication policy is at least one of a disclosure level, an anonymity level, a term of validity, and a disclosure scope of information or a combination thereof that are transmitted to at least one or more of said communication terminals.

6. The communication system according to claim 4, wherein the information to be transmitted to said at least one or more communication terminals is at least one of a mail address, a telephone number, and predetermined private information.

7. The communication system according to claim 1, wherein at least one of said at least two communication terminals comprises said posture status detector, said relationship calculator, and said communication policy determining unit.

8. The communication system according to claim 1, wherein said at least two communication terminals are each owned by a different user.

9. A communication system comprising at least one first communication terminal or more, at least one second communication terminal or more, and a server,
wherein said first communication terminal comprises:
a posture status detector that detects a posture status of its own first communication terminal; and
a transmitter that transmits said detected posture status and an identifier of its own first communication terminal to said second communication terminal;
wherein said second communication terminal comprises:
a posture status detector that detects a posture status of its own second communication terminal;
a relationship calculator that calculates a relationship between said first communication terminal and said second communication terminal based on the posture status of said first communication terminal and the posture status of said second communication terminal;
a communication policy determining unit that determines a communication policy to be applied between said first communication terminal and said second communication terminal based on said calculated relationship; and
a transmitter that transmits said determined communication policy, and identifiers of said first communication terminal and said second communication terminal to said server; and
wherein said server comprises a communication unit that, based on the identifiers of said first communication terminal and said second communication terminal, and said communication policy, configures communication based on said communication policy for the communication between said first communication terminal and said second communication terminal.

10. The communication system according to claim 9,
wherein said first communication terminal further comprises:
a relationship calculator that calculates a relationship between said first communication terminal and said second communication terminal based on the posture status of said first communication terminal and the posture status of said second communication terminal;
a communication policy determining unit that determines a communication policy to be applied between said first communication terminal and said second communication terminal based on said calculated relationship, wherein
said transmitter transmits said determined communication policy and the identifier of said first communication terminal to said second communication terminal; and
wherein the transmitter of the second communication terminal confirms whether the communication policy coming from said first communication terminal coincides with the communication policy coming from said second communication terminal, and transmits said communication policy, and the identifiers of said first communication terminal and said second communication terminal to said server when the communication policies coincide with each other.

11. A communication terminal in a communication system comprising a communication policy determining unit that determines, based on a relationship of a posture status between the communication terminals, a communication policy to be applied between said communication terminals, and a server that configures communication based on said determined communication policy between said communication terminals, the communication terminal comprising:
- a posture status detector that detects a posture status of its own communication terminal;
- a receiver that receives a posture status of a communication destination communication terminal, being a communication destination, and an identifier of said communication destination communication terminal;
- a relationship calculator that calculates a relationship between said own communication terminal and said communication destination communication terminal based on the posture status of said own communication terminal and the posture status of said communication destination communication terminal; and
- a transmitter that transmits said calculated relationship, and the identifiers of said own communication terminal and said communication destination communication terminal to said communication policy determining unit.

12. A communication terminal in a communication system comprising a server including a communicating unit that configures communication based on a communication policy between communication terminals, the communication terminal comprising:
- a posture status detector that detects a posture status of its own communication terminal;
- a receiver that receives a posture status of a communication destination communication terminal, being a communication destination, and an identifier of said communication destination communication terminal;
- a relationship calculator that calculates a relationship between said own communication terminal and said communication destination communication terminal based on the posture status of said own communication terminal and the posture status of said communication destination communication terminal;
- a communication policy determining unit that determines a communication policy to be applied between said own communication terminal and said communication destination communication terminal based on said calculated relationship; and
- a transmitter that transmits said determined communication policy, and the identifiers of said own communication terminal and said communication destination communication terminal to said communicating unit.

13. The communication terminal according to claim 12, wherein said communication terminals are each owned by a different user.

14. A communication method in a communication system comprising at least two communication terminals or more, and a server, the communication method comprising:
- detecting a posture status of each of the at least two communication terminals;
- calculating a relationship between said at least two communication terminals based on the detected posture status of said each communication terminal;
- determining information to be transmitted to at least one or more of said at least two communication terminals, based on the calculated relationship between said at least two communication terminals; and
- configuring, by said server, communication between said at least two communication terminals, based on said determined information.

15. A non-transitory computer readable storage medium which stores a program of a communication terminal in a communication system comprising a communication policy determining unit that determines, based on a relationship of a posture status between communication terminals, a communication policy to be applied between said communication terminals, and a server that configures communication based on said determined communication policy between said communication terminals, the program causing the communication terminal to execute:
- a posture status detecting process of detecting a posture status of its own communication terminal;
- a receiving process of receiving a posture status of a communication destination communication terminal, being a communication destination, and an identifier of said communication destination communication terminal;
- a relationship calculating process of calculating a relationship between said own communication terminal and said communication destination communication terminal based on the posture status of said own communication terminal and the posture status of said communication destination communication terminal; and
- a transmitting process of transmitting said calculated relationship, and the identifiers of said own communication terminal and said communication destination communication terminal to said communication policy determining unit.

16. The non-transitory computer readable storage medium according to claim 15, wherein said communication terminals are each owned by a different user.

17. A non-transitory computer readable storage medium which stores a program of a communication terminal in a communication system comprising a server including a communicating unit that configures communication based on a communication policy between the communication terminals, the program causing the communication terminal to execute:
- a posture status detecting process of detecting a posture status of its own communication terminal;
- a receiving process of receiving a posture status of a communication destination communication terminal, being a communication destination, and an identifier of said communication destination communication terminal;
- a relationship calculating process of calculating a relationship between said own communication terminal and said communication destination communication terminal based on the posture status of said own communication terminal and the posture status of said communication destination communication terminal;
- a communication policy determining process of determining a communication policy to be applied between said own communication terminal and said communication destination communication terminal based on said calculated relationship; and
- a transmitting process of transmitting said determined communication policy, and the identifiers of said own communication terminal and said communication destination communication terminal to said communicating unit of said server.

* * * * *

UNITED STATES PATENT AND TRADEMARK OFFICE
CERTIFICATE OF CORRECTION

PATENT NO.         : 9,071,700 B2                              Page 1 of 1
APPLICATION NO.    : 13/581235
DATED              : June 30, 2015
INVENTOR(S)        : Yuki Toyoda and Takeaki Minamizawa It is certified that error appears in the above-identified patent and that said Letters Patent is hereby corrected as shown below:

In the Drawings

Drawing Sheet 13 of 26, Fig. 18: delete "Communication Server F" and insert
-- Communication Server H --

Signed and Sealed this
Tenth Day of May, 2016

Michelle K. Lee
*Director of the United States Patent and Trademark Office*